(12) United States Patent
Miki

(10) Patent No.: US 9,016,163 B2
(45) Date of Patent: Apr. 28, 2015

(54) BICYCLE CONTROL DEVICE

(75) Inventor: Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 591 days.

(21) Appl. No.: 11/767,895

(22) Filed: Jun. 25, 2007

(65) Prior Publication Data

US 2008/0314183 A1    Dec. 25, 2008

(51) Int. Cl.
*B62M 25/04*    (2006.01)
*B62K 23/06*    (2006.01)
*B62L 3/02*    (2006.01)

(52) U.S. Cl.
CPC ............ *B62M 25/04* (2013.01); *Y10T 74/20438* (2015.01); *Y10T 74/20037* (2015.01); *B62K 23/06* (2013.01); *B62L 3/02* (2013.01)

(58) Field of Classification Search
USPC ............................ 74/501.6, 502.2, 488, 489
IPC .................................. F16C 1/10,1/12
See application file for complete search history.

(56) References Cited

U.S. PATENT DOCUMENTS

| | | |
|---|---|---|
| 4,532,825 A | 8/1985 | Nagano |
| 4,995,280 A | 2/1991 | Tagawa |
| 5,094,120 A | 3/1992 | Tagawa |
| 5,257,683 A | 11/1993 | Romano |
| 5,400,675 A | 3/1995 | Nagano |
| 5,676,022 A * | 10/1997 | Ose ............................... 74/502.2 |
| 5,957,002 A * | 9/1999 | Ueng ............................ 74/502.2 |
| 6,155,132 A | 12/2000 | Yamane |
| 6,220,111 B1 * | 4/2001 | Chen .......................... 74/473.15 |
| 6,450,060 B1 * | 9/2002 | Shahana ..................... 74/502.2 |
| 6,810,764 B2 | 11/2004 | Chen |
| 7,194,928 B2 | 3/2007 | Kawakami |
| 2006/0070479 A1 * | 4/2006 | Ose ............................... 74/502.2 |
| 2006/0086198 A1 * | 4/2006 | Tsumiyama .................. 74/502.2 |
| 2007/0068316 A1 * | 3/2007 | Kawakami et al. ........... 74/502.2 |
| 2008/0314185 A1 * | 12/2008 | Miki ........................... 74/473.14 |

FOREIGN PATENT DOCUMENTS

| | | |
|---|---|---|
| EP | 1 591 353 A2 | 11/2005 |
| EP | 1 736 404 A1 | 12/2006 |
| JP | 3283289 B2 | 3/2002 |

* cited by examiner

*Primary Examiner* — Daniel Yabut
(74) *Attorney, Agent, or Firm* — Global IP Counselors

(57) ABSTRACT

A bicycle control device is basically provided with a base member, a release member, a shift operating lever and a release pawl. The release member is pivotally mounted relative to the base member about a pivot axis. The shift operating lever is pivotally mounted relative to the base member. The release pawl is movably mounted on the shift operating lever such that the release pawl is movable from a rest position in a direction away from the pivot axis to a release operating position.

3 Claims, 16 Drawing Sheets

# BICYCLE CONTROL DEVICE

BACKGROUND OF THE INVENTION

1. Field of the Invention

This invention generally relates to a bicycle control device for operating a bicycle component. More specifically, the present invention relates to a bicycle control (component actuating) device that has an inner wire release mechanism that is compact.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo). While these types of control devices work well, it is desirable to provide a bicycle control (component actuating) device that is relatively easily compact.

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a control (component actuating) device that is relatively compact.

The foregoing objects can basically be attained by providing a bicycle control device that basically comprises a base member, a release member, a shift operating lever and a release pawl. The release member is pivotally mounted relative to the base member about a pivot axis. The shift operating lever is pivotally mounted relative to the base member. The release pawl is movably mounted on the shift operating lever such that the release pawl is movable from a rest position in a direction away from the pivot axis to a release operating position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
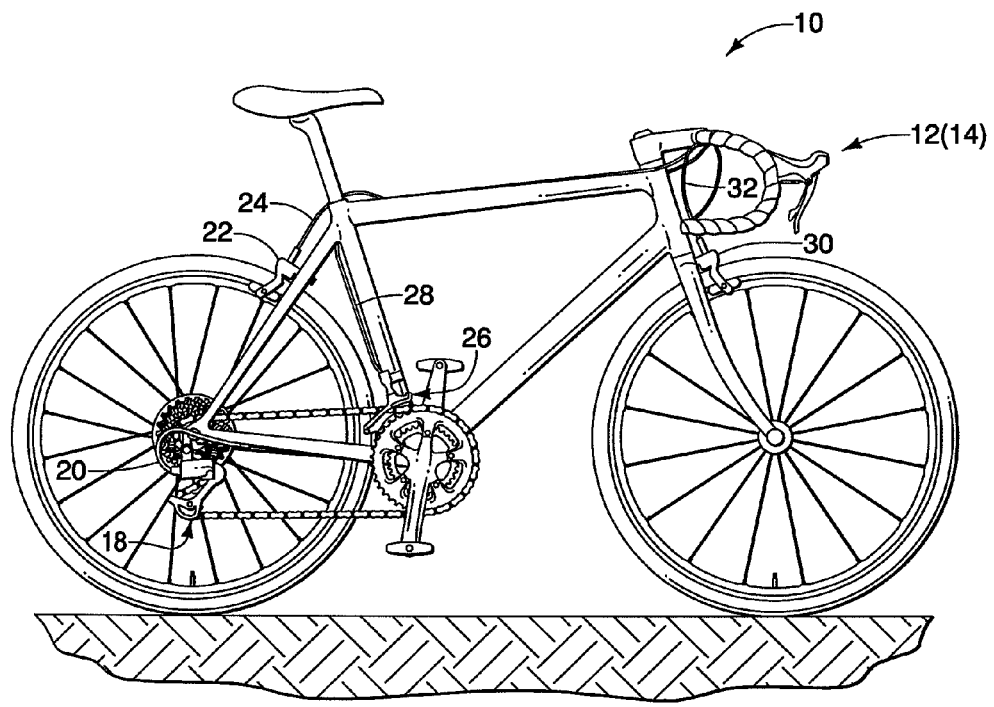
FIG. 1 is a side elevational view of bicycle equipped with a bicycle control (brake/shift) device coupled to a drop type handlebar in accordance with a preferred embodiment of the present invention.
Figure 2:
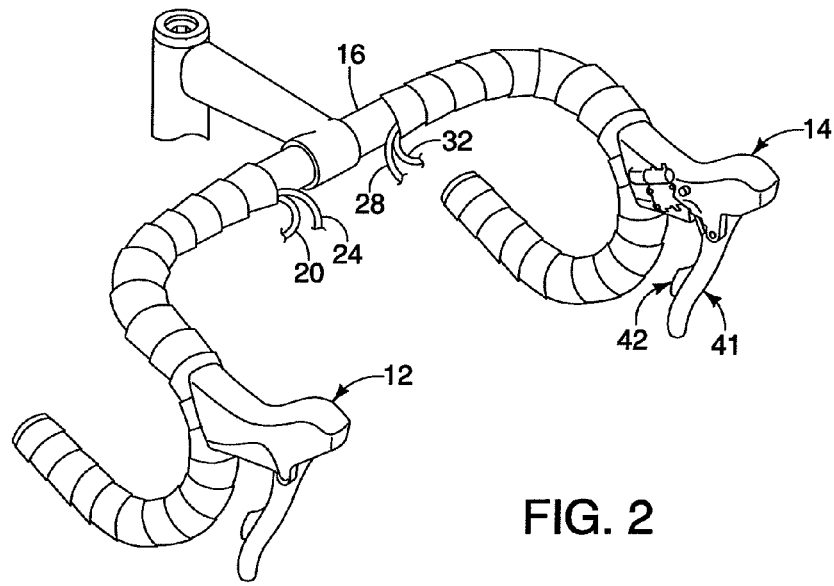
FIG. 2 is an enlarged partial perspective view of the drop type handlebar with the bicycle control (brake/shift) device in accordance with the illustrated embodiment of the present invention.

Referring initially to FIGS. 1 and 2, a bicycle 10 is illustrated in accordance with a pair of bicycle control devices 12 and 14 mounted on a bicycle handlebar 16 in accordance with one embodiment of the present invention. The bicycle control device 12 is a right hand side control device operated by the rider's right hand, while the bicycle control device 14 is a left hand side control device operated by the rider's left hand. In the illustrated embodiment, the bicycle control device 12 is operatively coupled to a rear derailleur 18 via a shift control cable 20 and a rear brake device 22 via a brake control cable 24. The bicycle control device 14 is operatively coupled to a front derailleur 26 via a shift control cable 28 and a front brake device 30 via a brake control cable 32. Alternatively, the bicycle control devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side bicycle control device 14 is substantially identical to the right hand side bicycle control device 12, except for the shifting unit (not shown) of the right hand side bicycle control device 12 has been modified to increase the number of gears that can be shifted. In any event, the right and left hand side bicycle control devices 12 and 14 are essentially identical in operation, except that they are mirror images of each other and the number of shift positions are different. Thus, only the left hand side bicycle control device 14 will be discussed and illustrated herein. Preferably, the cables 20, 24, 28 and 32 are conventional bicycle control cables that have an outer casing the covers an inner wire.

Referring now to FIGS. 3 to 11, the left hand side bicycle control device 14 basically includes a base member 36, a shift control unit 38 (FIGS. 9 to 11), a control (wire pulling) member 40, a first shift operating lever 41 and a second shift operating lever 42. The first shift operating lever 41 is a dual function operating lever that performs a braking operation in addition to a shifting operation. Thus, the bicycle control device 14 is configured and arranged to perform both a braking operation and a shifting operation as a single integrated unit that is mounted to the handlebar 16. In the illustrated embodiment, the first shift operating lever 41 is configured and arranged to perform a wire pulling operation and a braking operation, while the second shift operating lever 42 is configured and arranged to perform a wire releasing operation. The second shift operating lever 42 is located behind the first shift operating lever 41, when the first and second shift operating levers 41 and 42 are in rest positions. The first and second shift operating levers 41 and 42 are aligned in a non-shift movement plane or path BP of the first shift operating lever 41, when the first and second shift operating levers 41 and 42 are in rest positions.

Figure 3:
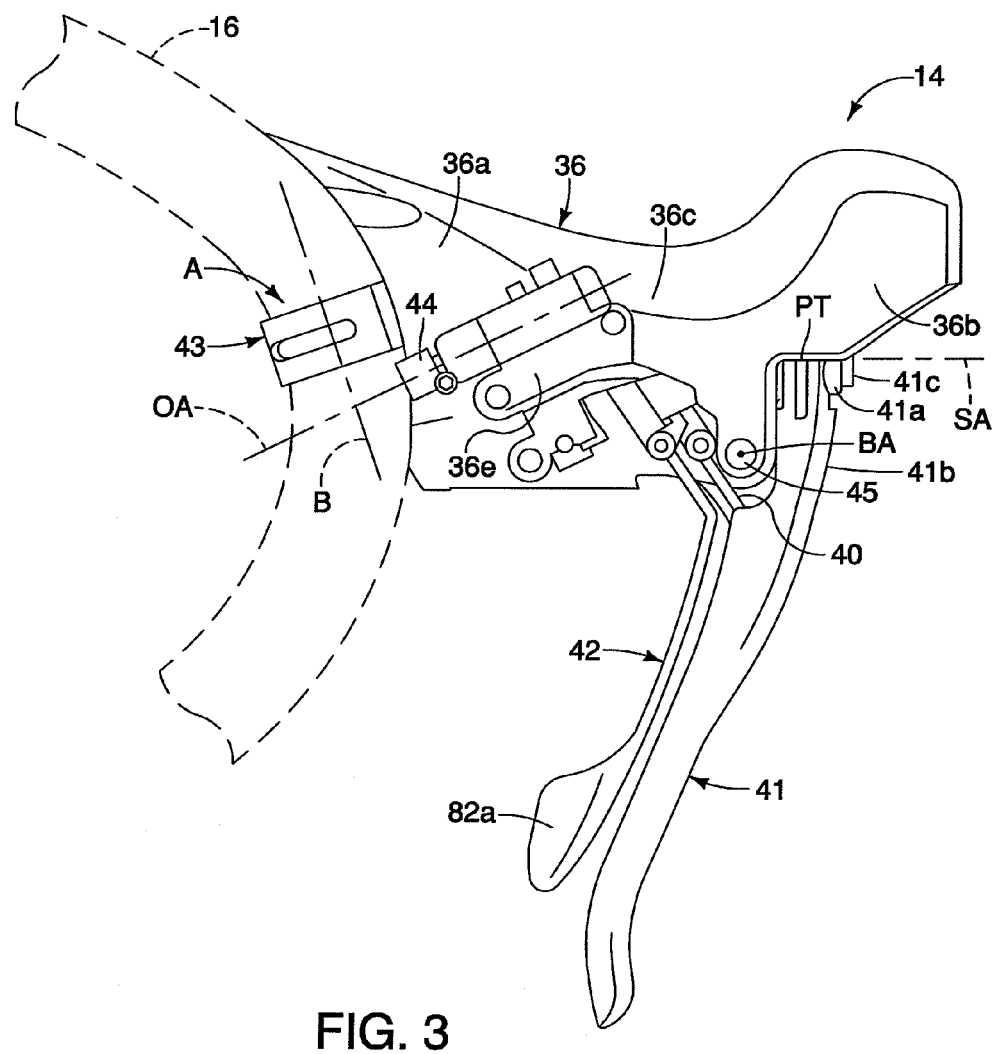
FIG. 3 is an inside elevational view of the left bicycle control (brake/shift) device with the first and second shift operating levers in the rest positions.
Figure 4:
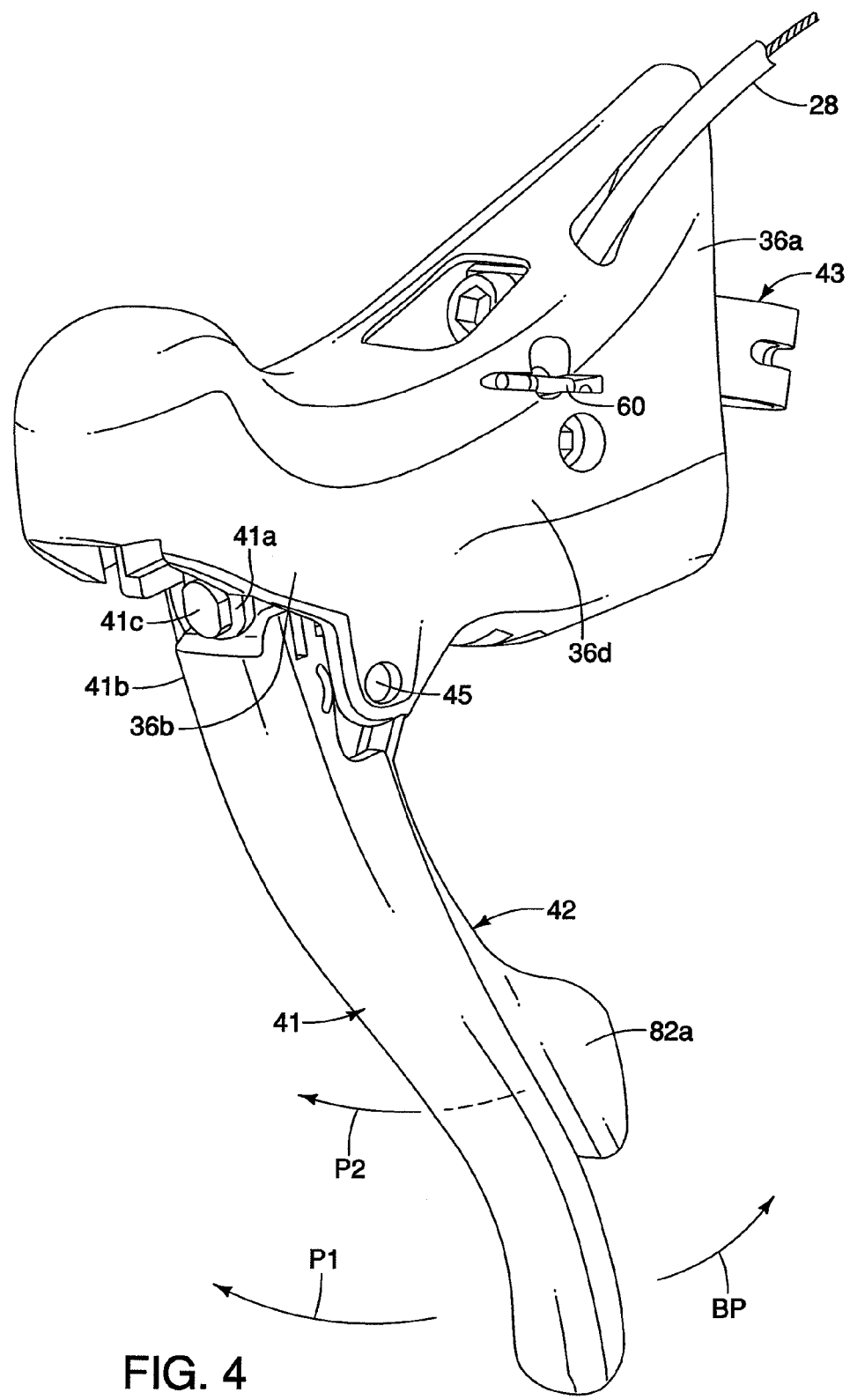
FIG. 4 is an outside perspective view of the left bicycle control (brake/shift) device with the first and second shift operating levers in the rest positions.

As best seen in FIGS. 3 and 4, the base member 36 includes a main body having a first end section 36a with a handlebar mounting structure 43 and a second end section 36b remotely disposed from the first end section 36a. The first and second shift operating levers 41 and 42 are located at the second end section 36b of the main body. The base member 36 is fixedly mounted to the handlebar 16 by the handlebar mounting structure 43, which defines a handlebar receiving area A with a central handlebar mounting axis B. The handlebar mounting structure 43 is preferably a conventional band clamp or similar structure.

Figure 5:
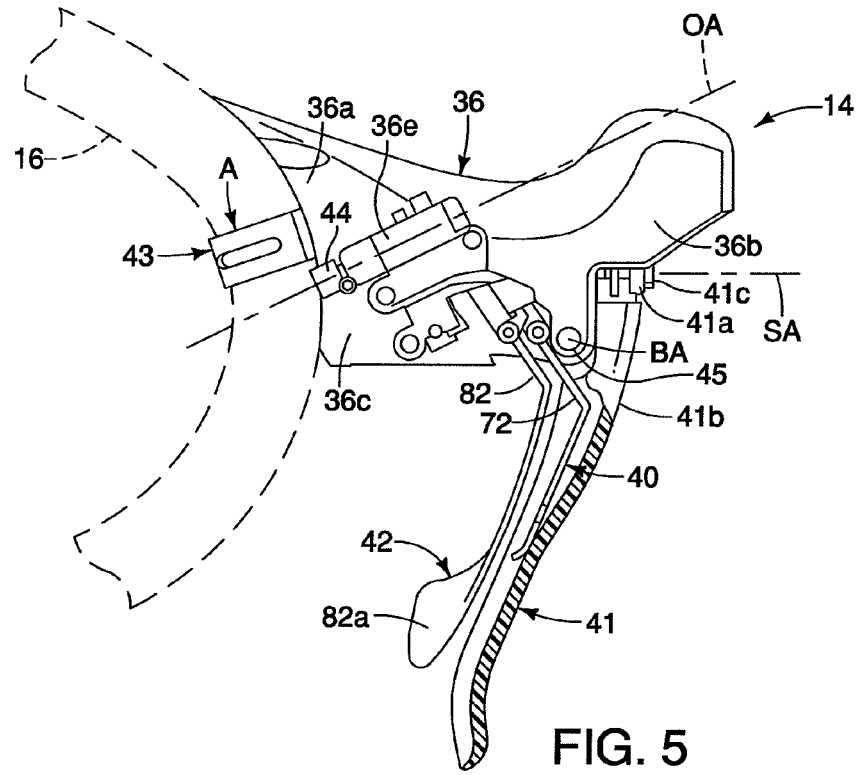
FIG. 5 is an inside elevational view of the left bicycle control (brake/shift) device with the first and second shift operating levers in the rest positions and a portion of the first shift operating lever broken away to illustrate the sliding connection between the first shift operating lever and the control lever.
Figure 6:
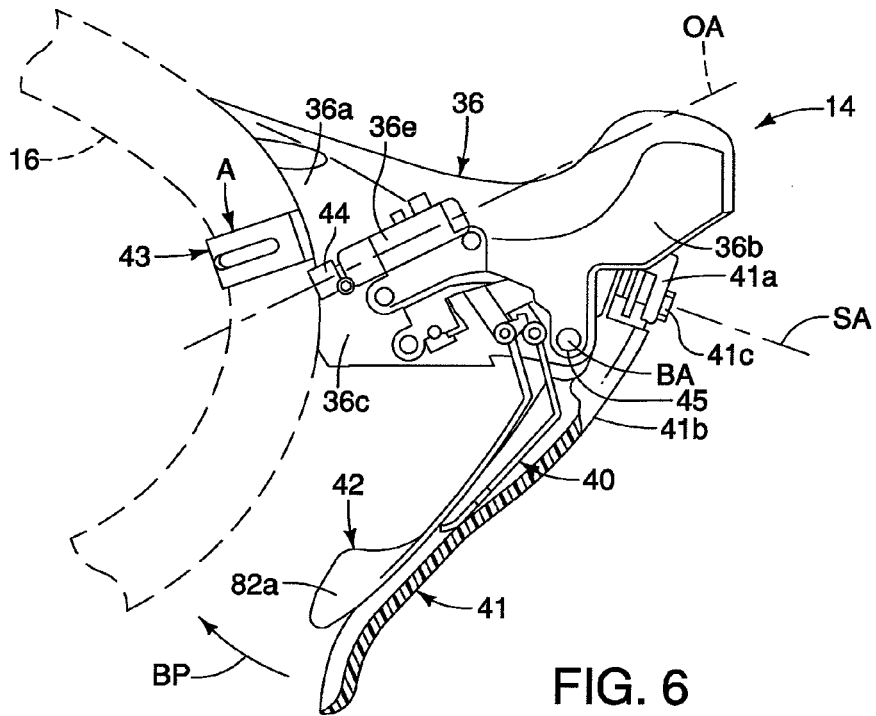
FIG. 6 is an inside elevational view, similar to FIG. 5, of the left bicycle control (brake/shift) device with the first and second shift operating levers, but with the first shift operating lever moved to a braking position such that the second shift operating lever moves with the first shift operating lever.

As seen in FIGS. 3 to 8 and 12, the main body of the base member 36 further includes an inner lateral side wall 36c and an outer lateral side wall 36d. The shift control unit 38 is mounted to the base member 36 generally between the lateral side walls 36c and 36d. The inner lateral side wall 36c has a bulging part that is shaped to accommodate a shift unit axle or main pivot shaft 44 of the shift control unit 38 as explained below. As seen in FIGS. 5 and 6, the inner lateral side wall 36c of the base member 36 is provided with a removable panel 36e for installing and accessing the shift control unit 38 in the base member 36. This removable panel 36e forms a portion of the bulging part of the inner lateral side wall 36c. By having the shift unit axle 44 of the shift control unit 38 disposed closely adjacent the inner lateral side wall 36c, the shift control unit 38 can be formed with a large lever arm LA (FIG. 13) for pulling and releasing the inner wire of the shift control cable 28. In this way, the first shift operating lever 41 can be moved a short distance (stroke) while still pulling the inner wire of the shift control cable 28 by the necessary amount for causing a shift to occur.

Figure 9:
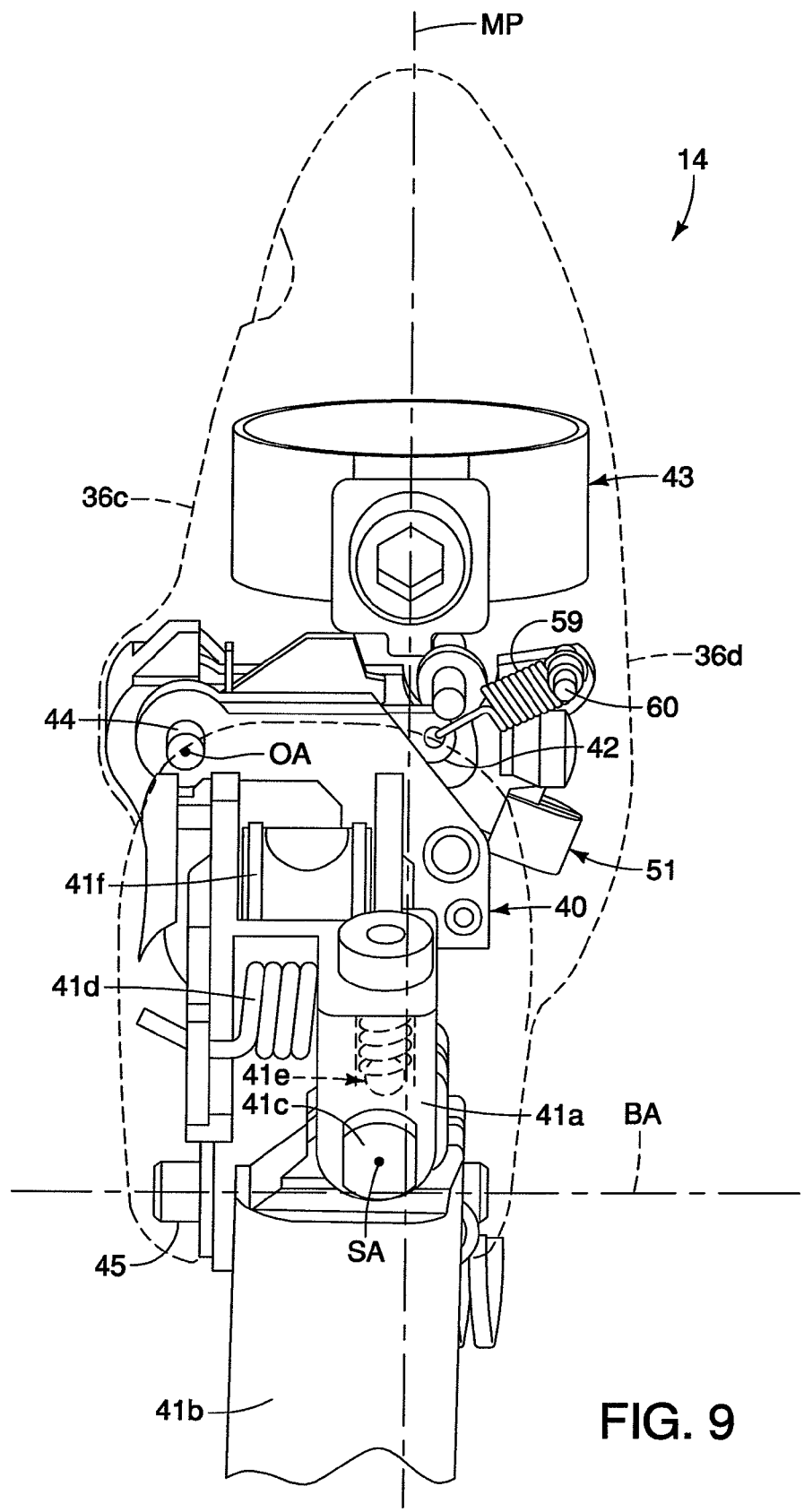
FIG. 9 is a front end view of the left bicycle control (brake/shift) device with the base member shown in phantom lines.
Figure 10:
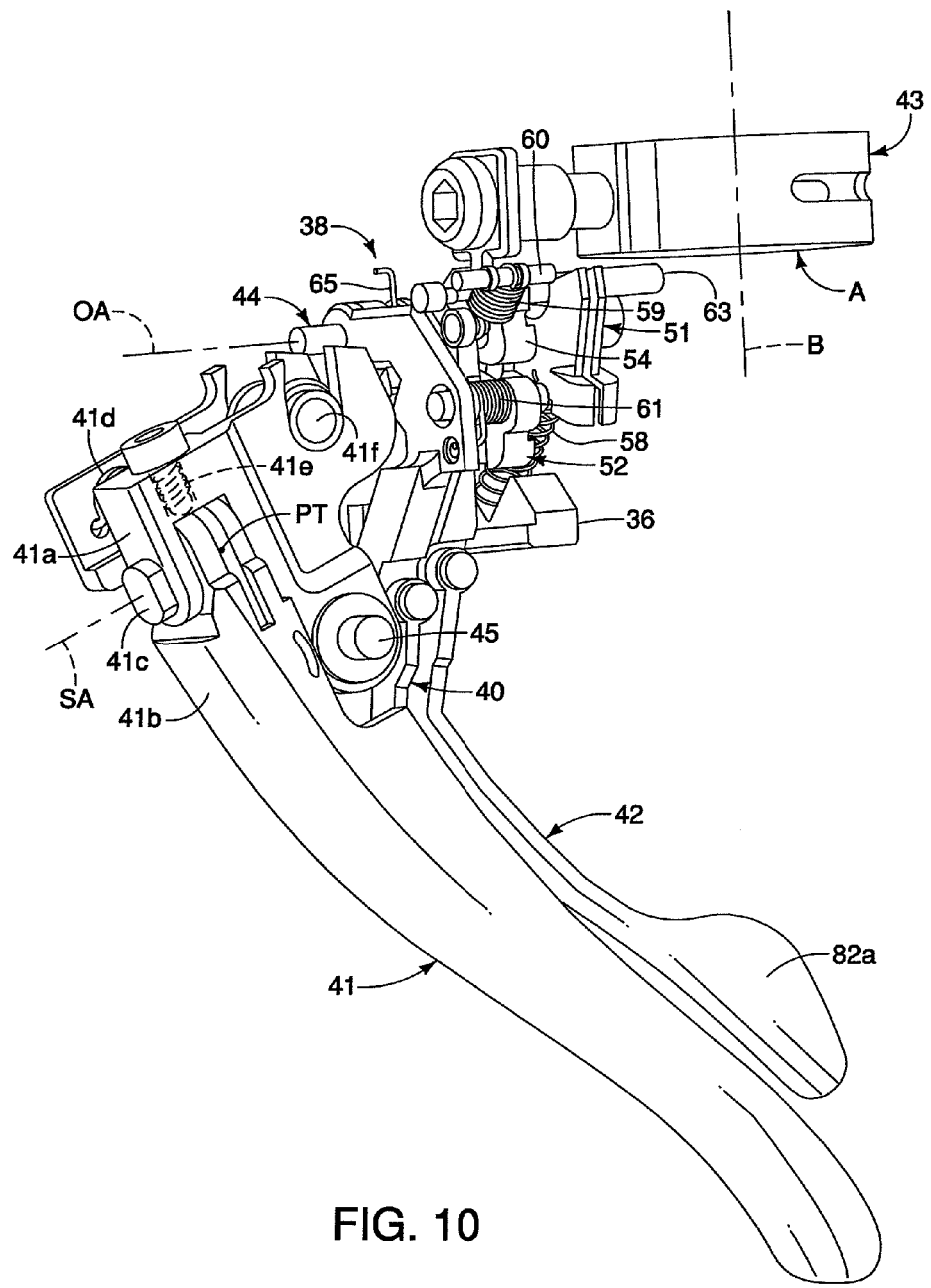
FIG. 10 is an enlarged partial outside perspective view of the left bicycle control (brake/shift) device with the base member removed to show the basic relationship of the first and second shift operating levers with respect to the shift control unit.
Figure 11:
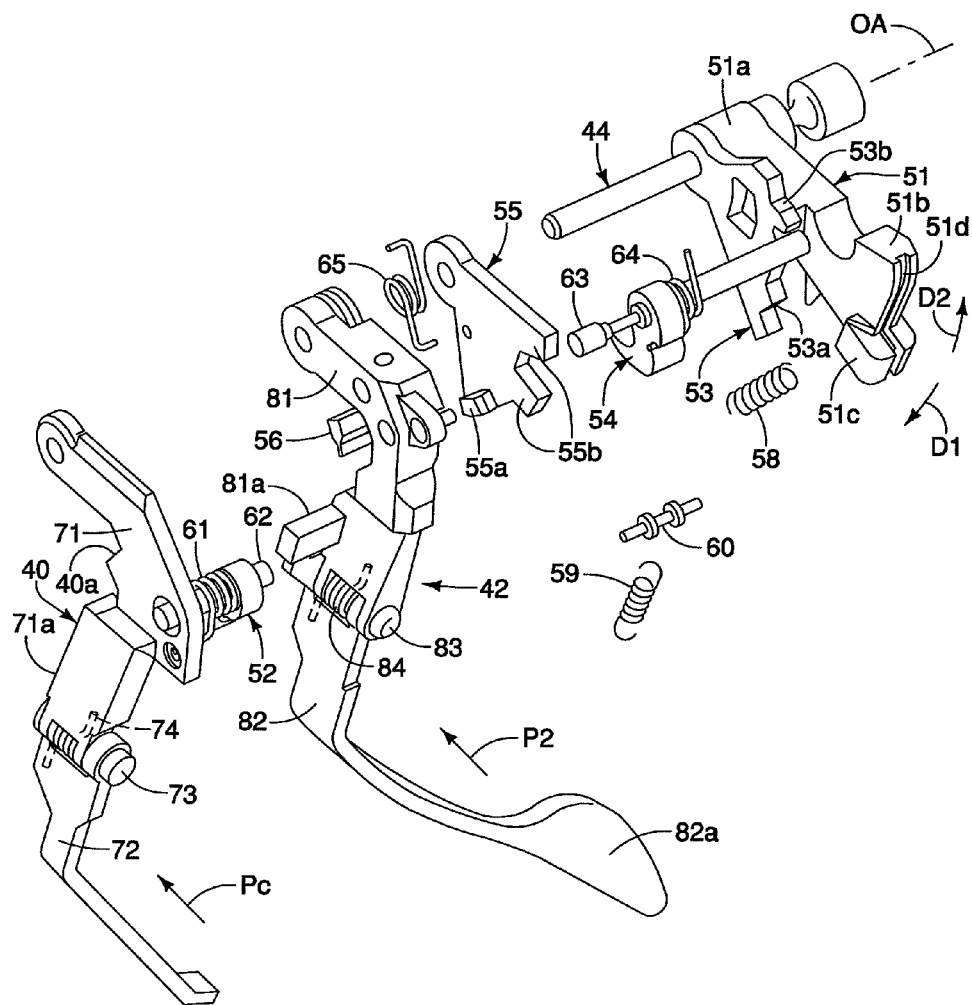
FIG. 11 is an exploded perspective view of selected parts of the shift control unit, the control member and the second shift operating lever.

In the illustrated embodiment, as seen in FIGS. 9 to 11, the shift control unit 38 is a cable operating device that includes a wire takeup member 51. The wire takeup member 51 is pivotally mounted on the shift unit axle 44, which defines a shift unit operating axis OA. The wire takeup member 51 is attached to the inner wire of the shift control cable 28 to pull and release the inner wire of the shift control cable 28 in response to operation of the first and second shift operating levers 41 and 42, respectively.

The first shift operating lever 41 is operatively coupled to the shift control unit 38 via the control member 40 to operate the shift control unit 38 (mainly, the wire takeup member 51) in a first operating direction D1 or a wire pulling direction about the shift unit axle 44 of the shift control unit 38. The second shift operating lever 42 is operatively coupled to the shift control unit 38 to operate the shift control unit 38 (mainly, the wire takeup member 51) in a second operating direction D2 or a wire releasing direction about the shift unit axle 44 of the shift control unit 38.

The first shift operating lever 41 preferably includes a mounting part 41a and an operating part 41b with the operating part 41b pivotally mounted to the mounting part 41a by a pivot pin 41c about a first shift operating axis SA. The mounting part 41a of the first shift operating lever 41 is also movably coupled relative to the base member 36 by a pivot pin 45 about a non-shift pivot axis or a brake lever pivot axis BA for performing the braking operation. Thus, the operating part 41b of the first shift operating lever 41 is movably coupled to mounting part 41a (i.e., relative to the base member 36) to move along a first shift operating plane or path P1 and movably coupled relative to the base member 36 to move along the non-shift (brake) movement plane or path BP that is non-coincident with the first shift operating plane or path P1. The operating part 41b is biased about the pivot pin 41c to a rest position with respect the first shift operating plane or path P1 by a biasing element 41d. As seen in FIG. 9, a ball and recess type positioning mechanism 41e is attached to the mounting part 41a to maintain the operating part 41b of the first operating lever 41 in the rest position. Also, as seen in FIG. 9, the first shift operating lever 41 includes a cable attachment structure 41f for attaching the brake control cable 32 thereto in a conventional manner.

The first shift operating lever 41 is operatively coupled to the shift control unit 38 via the control member 40 to operate the wire takeup member 51 of the shift control unit 38 in the first operating direction D1 as explained below. The first shift operating lever 41 is slidably engaged with the control member 40 such that the control member 40 is moved when the first shift operating lever 41 is moved along the non-shift (brake) movement path BP with sliding contact therebetween. Thus, when the first shift operating lever 41 is operated along the first shift operating plane or path P1, the control member 40 moves along a plane or path Pc. When the first shift operating lever 41 is operated along the non-shift (brake) movement path BP, the control member 40 moves along the non-shift (brake) movement path BP or a plane or path that is generally parallel to the non-shift (brake) movement plane or path BP.

In the illustrated embodiment, the first shift operating axis SA of the first shift operating lever 41 and the shift unit operating axis OA of the shift control unit 38 are offset from each other in a lateral direction of the main body of the base member 36. Preferably, the shift unit axle 44 of the shift control unit 38 is disposed closer to the inner lateral side wall 36c than a lever pivot point PT of the first shift operating lever 41 as defined by the first shift operating axis SA. In particular, the lever pivot point PT of the first shift operating lever 41 is disposed closer to a midpoint or plane MP between the lateral side walls 36c and 36d than the shift unit axle 44 of the shift control unit 38. In fact, as seen in FIGS. 5 to 8, a head portion of the shift unit axle 44 projects out of the inner lateral side wall 36c in the illustrated embodiment. This arrangement allows the shift unit operating axis OA of the shift control unit 38 to be disposed very close to the inner lateral side wall 36c of the base member 36. Moreover, since the head portion of the shift unit axle 44 projects out of the inner lateral side wall 36c, the base member 36 can be easily manufactured and the shift unit axle 44 can be easily installed on the inner lateral side wall 36c of the base member 36.

The second shift operating lever 42 is operatively coupled to the shift control unit 38 to move along a second shift operating plane or path P2 to operate the wire takeup member 51 of the shift control unit 38 in the opposite (second) operating direction D2 from the first operating direction D1 due to operation of the first shift operating lever 41. The second shift operating lever 42 and the control member 40 pivot about a coincident pivot axis (i.e., the shift unit operating axis OA) when performing shifting operations as explained below.

Thus, the first and second shift operating levers 41 and 42 are coupled relative to the base member 36 to move along first and second shift operating planes P1 and P2, respectively, that intersect with the non-shift (brake) movement path BP (non-shift movement plane) of the first shift operating lever 41. The non-shift (brake) movement path BP (non-shift movement plane) of the first shift operating lever 41 is perpendicularly oriented with respect to the first and second shift operating planes or paths P1 and P2 of the first and second shift operating levers 41 and 42

Now referring to FIGS. 4 to 8, the movements of the first and second shift operating levers 41 and 42 will now be generally discussed with respect to the base member 36 that is configured to be fixedly mounted to the handlebar 16 by the handlebar mounting structure 43. In this illustrated embodiment, the first and second shift operating levers 41 and 42 are configured and arranged relative to each other such that they are aligned in the non-shift (brake) movement path BP to move in the non-shift (brake) movement path BP. In particular, the second shift operating lever 42 is located behind the first shift operating lever 41. The control member 40 contacts the rearward facing side of the first shift operating lever 41 and is located between the first and second shift operating levers 41 and 42. The first and second shift operating levers 41 and 42 are configured and arranged to pivot in a first rotational direction and a second rotational direction with respect to the base member 36 from the rest positions, respectively, with the first and second rotational directions being directions toward a central longitudinal plane of the bicycle 10.

Figure 7:
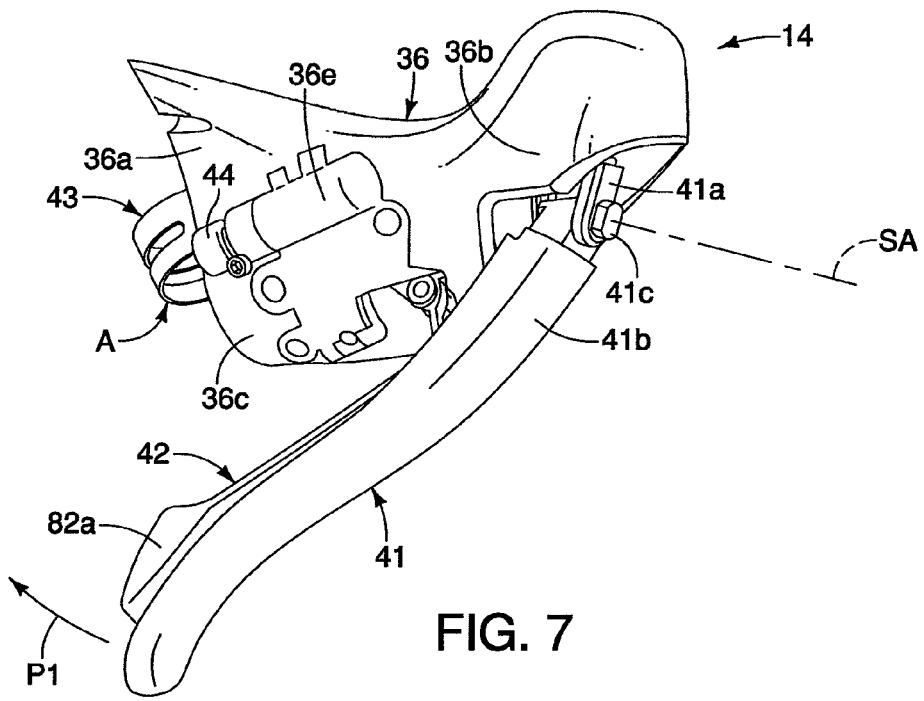
FIG. 7 is an inside perspective view of the left bicycle control (brake/shift) device with the first shift operating lever moved to a shifting position such that the second shift operating lever moves with the first shift operating lever.

As seen in FIGS. 4 and 7, in this illustrated embodiment, the first and second shift operating levers 41 and 42 are configured and arranged relative to each other such that the second shift operating lever 42 is moved by the first shift operating lever 41 when the first shift operating lever 41 is operated to move the wire takeup member 51 of shift control unit 38 in the first operating direction D1 about the shift unit axle 44 of the shift control unit 38. In other words, when a wire pulling operation is desired, the rider pushes the first shift operating lever 41 in a direction transverse to a center plane of the base member 36 along the first shift operating plane or path P1 from the first (rest) position (FIG. 4) to a second (shifting) position (FIG. 7) to operate the shift control unit 38. This movement of the first shift operating lever 41 operates the wire takeup member 51 of shift control unit 38 via the control member 40 in the first operating direction D1 which is a wire pilling operation in the illustrated embodiment. As mentioned above, the second shift operating lever 42 moves with the first shift operating lever 41 as the first shift operating lever 41 is moved from the first (rest) position to the second (shifting) position to operate the shift control unit 38.

As seen in FIGS. 5 and 6, in the illustrated embodiment, the first shift operating lever 41 pivots about the pivot pin 45 between a first (rest) position (FIG. 5) and a second (braking) position (FIG. 6) along the non-shift (brake) movement path BP. The movement of the first shift operating lever 41 from the rest position to the braking position results in the first and second shift operating levers 41 and 42 also being pivoted along the non-shift (brake) movement plane BP as seen in FIG. 6.

Figure 8:
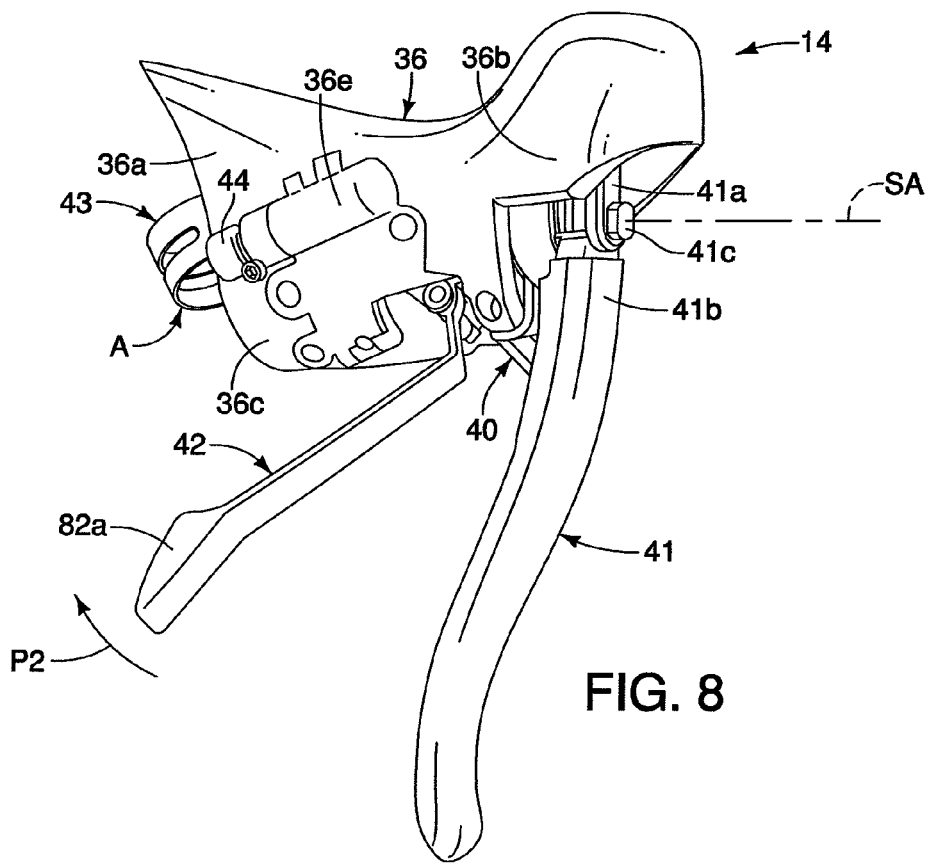
FIG. 8 is an inside perspective view of the left bicycle control (brake/shift) device with the second shift operating lever moved to a shifting position with the first shift operating lever remaining stationary.

As seen in FIGS. 4 and 8, in this illustrated embodiment, the first and second shift operating levers 41 and 42 are configured and arranged relative to each other such that the first shift operating lever 41 remains stationary when the second shift operating lever 42 is operated to move the wire takeup member 51 of shift control unit 38 in the second operating direction D2 about the shift unit axle 44 of the shift control unit 38. In other words, when a wire releasing operation is desired, the rider pushes the second shift operating lever 42 in a direction transverse to the center plane of the base member 36 along the second shift operating plane or path P2 from a first (rest) position to a second (shifting) position to operate the shift control unit 38. This movement of the second shift operating lever 42 operates the wire takeup member 51 of shift control unit 38 in the second operating direction D2 which is the wire releasing operation in the illustrated embodiment. As mentioned above, the second shift operating lever 42 moves independently with respect to the first shift operating lever 41 as the second shift operating lever 42 is moved from the first (rest) position to the second (shifting) position to operate the shift control unit 38.

Thus, the second shift operating lever 42 is a separate operating member from the first shift operating lever 41 and the second shift operating lever 42 can move independently of the first shift operating lever 41.

Referring now to FIGS. 9 to 11, the shift control unit 38 will now be discussed in more detail. The shift control unit 38 is mounted to the base member 36 by the shift unit axle 44. The shift control unit 38 is basically operated by the first and second shift operating levers 41 and 42 to pull or release the inner wire of the shift control cable 28 as mentioned above. The shift control unit 38 is also mounted to the base member 36 by the shift unit axle 44 as mentioned above.

In addition to the wire takeup member 51, mentioned above, the shift control unit 38 further includes a wire pulling pawl 52, a positioning plate or member 53, a positioning pawl 54, a release plate or member 55 and a release pawl 56. The wire takeup member 51, the positioning plate 53 and the release plate 55 are all rotatably mounted on the shift unit axle 44. In other words, the shift unit axle 44 forms the main pivot or operating axis OA of the shift control unit 38 with the wire takeup member 51, the positioning plate 53, the release plate 55 and the second shift operating lever 42 and the control member 40 being pivotally mounted about the main pivot or operating axis OA of the shift control unit 38. The wire takeup member 51 and the positioning plate 53 are fixed together as an integrated unit so as to rotate together. The release plate 55 can rotate independently of the wire takeup member 51 and the positioning plate 53. The wire pulling pawl 52 is pivotally mounted on the control member 40 so as to move with the first shift operating lever 41, when the first shift operating lever 41 is moved along the first shift operating plane P1. The release pawl 56 is pivotally mounted on the second shift operating lever 42 so as to move with the second shift operating lever 42, when the second shift operating lever 42 is moved along the second shift operating plane P2.

A return spring or biasing element 58 is preferably operatively coupled between the wire takeup member 51 and the base member 36 to urge the wire takeup member 51 and the positioning plate 53 in the wire releasing direction D2 about the shift unit axle 44. In the illustrated embodiment, the return spring or biasing element 58 is a compression spring with one end contacting the wire takeup member 51 and the other end contacting the base member 36, as seen in FIGS. 10 and 11. The wire takeup member 51 is also at least partially urged by a cable tension due to, for example, a pull force from the front derailleur 26.

A return spring or biasing element 59 is preferably operatively coupled between the second shift operating lever 42 and a mounting member 60 that is attached to the base member 36. In the illustrated embodiment, the return spring or biasing element 59 is a tension spring with one end fixed to the second shift operating lever 42 and the other end fixed to the mounting member 60. The return spring or biasing element 59 applies an urging force to the second shift operating lever 42 to bias the second shift operating lever 42 to the rest position. Since the second shift operating lever 42 abuts against the control member 40 that is held in its rest position by the positioning mechanism 41e, the second shift operating lever 42 stays in the rest position.

As mentioned above, the first shift operating lever 41 is configured and arranged relative to the wire takeup member 51 such that the first shift operating lever 41 performs the wire pulling operation of the wire takeup member 51 when the first shift operating lever 41 is operated. The second shift operating lever 42 is configured and arranged relative to the wire takeup member 51 such that the second shift operating lever 42 performs the wire releasing operation of the wire takeup member 51 when the second shift operating lever 42 is operated.

The wire takeup member 51 is a fan shaped member that is pivotally mounted relative to the base member 36 about the pivot or operating axis OA of the shift control unit 38. The wire takeup member 51 is fixed to the positioning plate 53 so that the wire takeup member 51 and the positioning plate 53 move together relative to the base member 36. The wire takeup member 51 has a proximal end portion 51a pivotally mounted on the shift unit axle 44 and a distal end portion 51b for pulling and releasing the inner wire of the cable 28. The proximal end portion 51a of the wire takeup member 51 is preferably narrower than the distal end portion 51b of the wire takeup member 51. However, other shapes of the wire takeup member 51 are possible without departing from the present invention.

The distal end portion 51b of the wire takeup member 51 has a peripheral edge with an inner wire attachment structure or point 51c and a wire receiving groove 51d. The wire attachment structure or point 51c is configured to catch an enlarged head 28a of the inner wire of the control cable 28. Thus, the wire takeup member 51 pulls and releases the inner wire of the control cable 28 on the peripheral edge of the distal end portion 51b. The peripheral edge of the distal end portion 51b forms an inner wire operation point OP determining the effective lever arm LA between the pivot or operating axis OA of the shift control unit 38 and the inner wire of the control cable 28 to selectively pull and release the inner wire of the cable 28 in response to pivotal movement of the wire takeup member 51. The inner wire operation point OP is located radially outwardly from the wire pulling pawl 52, the positioning plate 53, the positioning pawl 54, the release plate 55 and the release pawl 56 with respect to the pivot or operating axis OA of the shift control unit 38. In this embodiment, the inner wire operation point OP of the wire takeup member 51 is formed by an inner wire contact surface of the wire receiving groove 51d on the peripheral edge of the distal end portion 51b of the wire takeup member 51.

Figure 13:
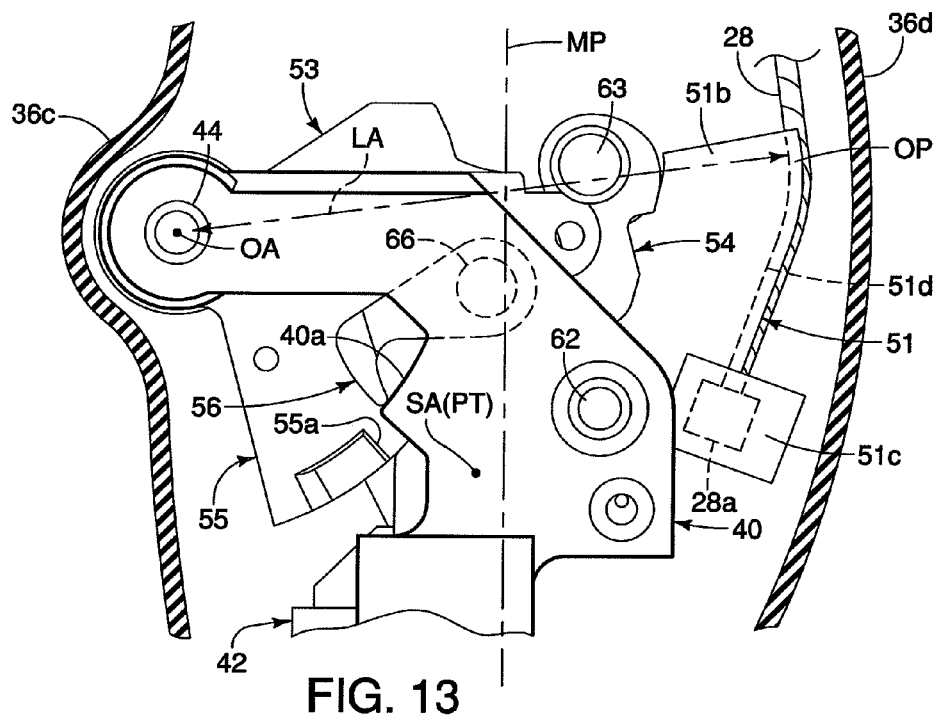
FIG. 13 is an enlarged partial elevational view of selected parts of the shift control unit and the upper ends of the control member and the second shift operating lever with the side walls of the base member being diagrammatically illustrated and the wire takeup member of the shift control unit being in a fully released position.
Figure 14:
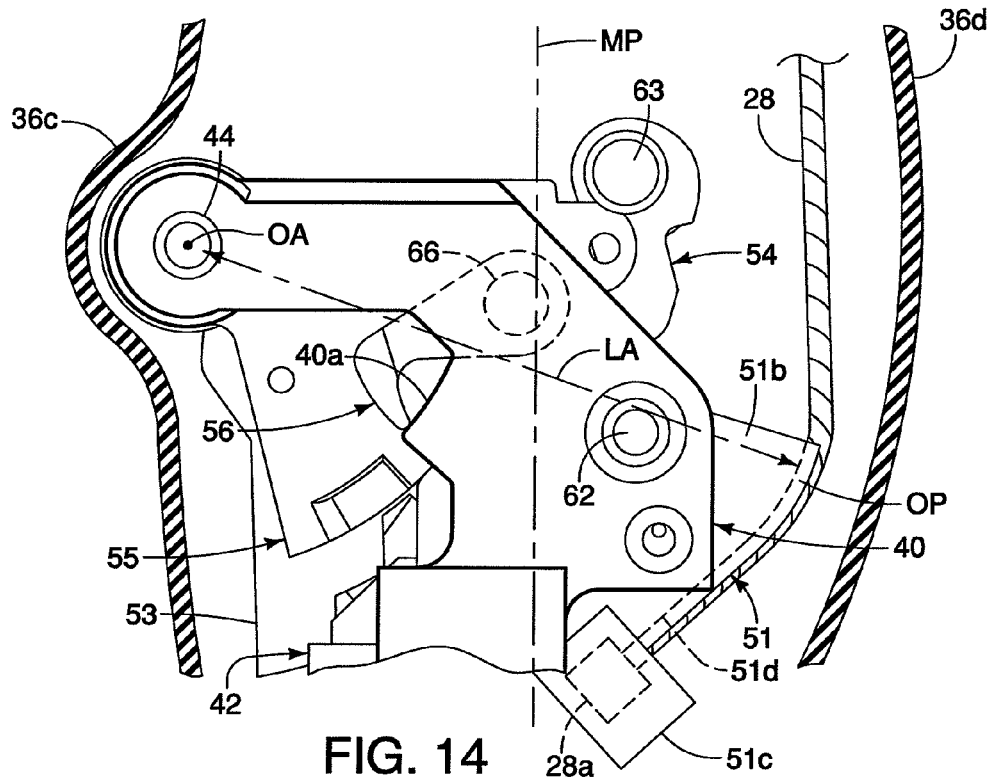
FIG. 14 is an enlarged partial elevational view of selected parts of the shift control unit and the upper ends of the control member and the second shift operating lever with the side walls of the base member being diagrammatically illustrated and the wire takeup member of the shift control unit being in a fully pulled position.
Figure 15:
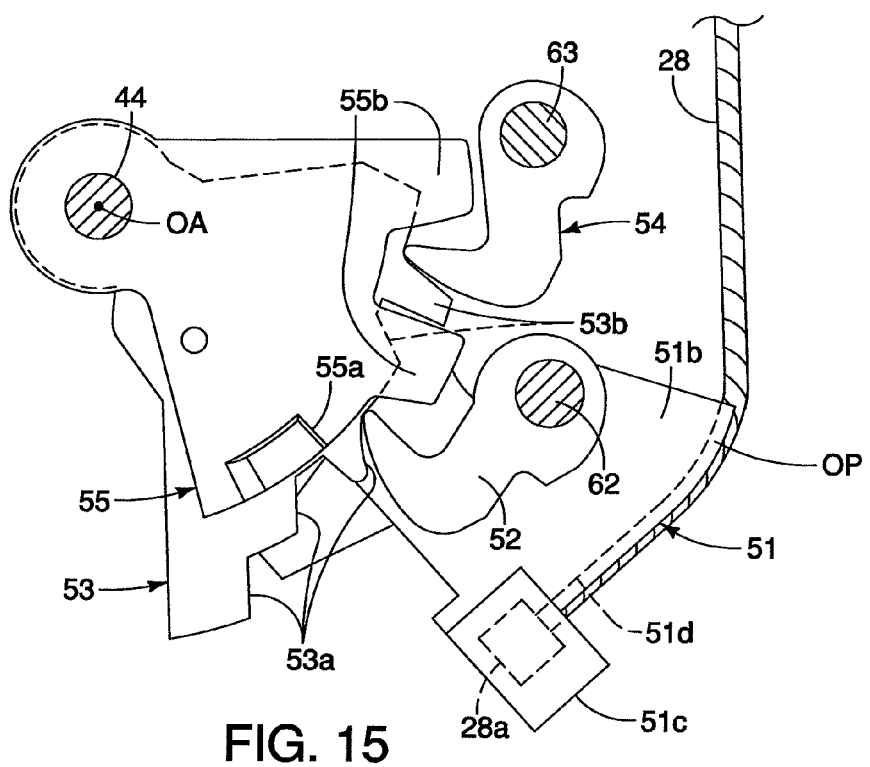
FIG. 15 is a simplified elevational view of selected parts of the shift control unit with the wire takeup member of the shift control unit being in the fully pulled position.

Referring to FIG. 13, the term "operation point" as used herein refers to a single point or an area of the inner wire takeup member 51 that determines the effective lever arm LA for controlling the effective amount of movement of the inner wire during the entire shifting operation in response to pivotally movement of the inner wire takeup member 51. In other words, for example, the "operation point" can be a single attachment point, or an inner wire contact surface with an effective lever arm that either remains constant or changes during the shifting operation. Of course, it will also be apparent from this disclosure that the "operation point" can be formed by a combination of an inner wire attachment point and an inner wire contact surface with the effective lever arm either remaining constant or changing during the shifting operation.

The wire pulling pawl 52 is pivotally mounted to the control (wire pulling) member 40, which in turn is pivotally mounted to the shift unit axle 44. The wire pulling pawl 52 is further pivotally arranged to engage the positioning plate 53 when the first shift operating lever 41 is moved from the rest position to the shifting position. The wire pulling pawl 52 is further pivotally arranged to be selectively disengaged from the positioning plate 53 in response to movement of the release plate 55 when the second shift operating lever 42 is moved from the rest position to the shifting position. The wire pulling pawl 52 is normally urged towards engagement with the positioning plate 53 by a biasing member 61. In this illustrated embodiment, the biasing member 61 is a torsion spring that is mounted on a pivot pin 62 which in turn attaches the wire pulling pawl 52 to the control (wire pulling) member 40.

The positioning plate 53 is fixedly coupled to the wire takeup member 51 so as to rotate together. The positioning plate 53 is pivotally mounted relative to the base member 36 about the main pivot or operating axis OA of the shift unit axle 44. In particular, the positioning plate 53 is a fan shaped member that has a narrow proximal end at the main pivot or operating axis OA of the shift unit axle 44 and a wide distal end. The wide distal end of the positioning plate 53 includes a plurality (three) of winding teeth or abutments 53a that are selectively engaged by the wire pulling pawl 52, and a plurality (two) of positioning teeth or abutments 53b that are selectively engaged by the positioning pawl 54. When the first shift operating lever 41 is moved from the first (rest) position to the second (shifting) position to operate the shift control unit 38, the wire pulling pawl 52 engages one of the winding abutments 53a of the positioning plate 53 to rotate the wire takeup member 51 in the wire pulling direction.

The positioning pawl 54 is pivotally mounted on a pivot pin 63, which is fixedly supported by the main body of the base member 36. The positioning pawl 54 is normally urged towards engagement with the positioning abutments 53b of the positioning plate 53 by a biasing member 64. In this illustrated embodiment, the biasing member 64 is a torsion spring that is mounted on the pivot pin 63 which in turn attach the positioning pawl 54 to the base member 36. Thus, positioning pawl 54 is pivotally mounted about a positioning pawl pivot axis of the pivot pin 63 to operatively engage the abutments 53b of the positioning plate 53. In other words, the positioning abutments 53b are selectively engaged by the positioning pawl 54 to maintain the positioning plate 53 and the wire takeup member 51 in one of a plurality of predetermined positions. When the first shift operating lever 41 is moved from the first (rest) position to the second (shifting) position to operate the shift control unit 38, the positioning pawl 54 moves momentarily out of holding engagement with the positioning abutments 53b of the positioning plate 53 in response to movement of the positioning plate 53.

In this illustrated embodiment, the inner wire operation point OP is located radially outwardly from both the positioning abutments 53b of the positioning plate 53 and a positioning pawl pivot axis of the pivot pin 63 with respect to the pivot or operating axis OA of the shift control unit 38. Likewise, the inner wire attachment structure 51c is located radially outwardly from the positioning abutments 53b and the positioning pawl pivot axis of the pivot pin 63 with respect to the pivot or operating axis OA of the shift control unit 38.

The release plate 55 cooperates with the positioning pawl 54 to release the wire takeup member 51 so that the wire takeup member 51 rotates in the wire releasing direction D2 due to the urging force of the return spring or biasing element 58 and a cable tension due to, for example, a pull force from the front derailleur 26. The release plate 55 is pivotally mounted relative to the base member 36 about the main pivot or operating axis OA of the shift unit axle 44. The release plate 55 and the positioning pawl 54 are configured and arranged relative to each other such that the positioning pawl 54 is moved by the release plate 55 from a retaining position that retains the positioning plate 53 in a shift position to a releasing position that releases the positioning plate 53 in response to movement of the release plate 55. Also the release plate 55 and the wire pulling pawl 52 are configured and arranged relative to each other such that the wire pulling pawl 52 is moved with respect to the positioning plate 53 in response to movement of the release plate 55 by the second shift operating lever 42.

The release plate 55 is a fan shaped member that has a narrow proximal end at the main pivot or operating axis OA of the shift unit axle 44 and a wide distal end. In particular, the wide distal end of the release plate 55 includes a driving abutment 55a and a plurality (two) of release teeth or abutments 55b. The driving abutments 55a is selectively engaged by the release pawl 56 in response to initial movement of the second shift operating lever 42 from the rest position towards the shifting position. Upon rotation of the release plate 55, the release abutments 55b selectively engage the wire pulling pawl 52 and the positioning pawl 54 to move (pivot) them out of engagement with the winding abutments 53a and the positioning abutments 53b, respectively. Basically, the release plate 55 remains stationary when the first shift operating lever 41 is operated and moves when the second shift operating lever 42 is operated. A biasing member 65 is provided on the shift unit axle 44 to urge the release plate 55 towards the rest position in the second operating direction D2. In this illustrated embodiment, the biasing member 65 is a torsion spring with the coiled portion mounted on the shift unit axle 44, a first end engaging the release plate 55 and a second end engaging a part of the base member 36.

Figure 12:
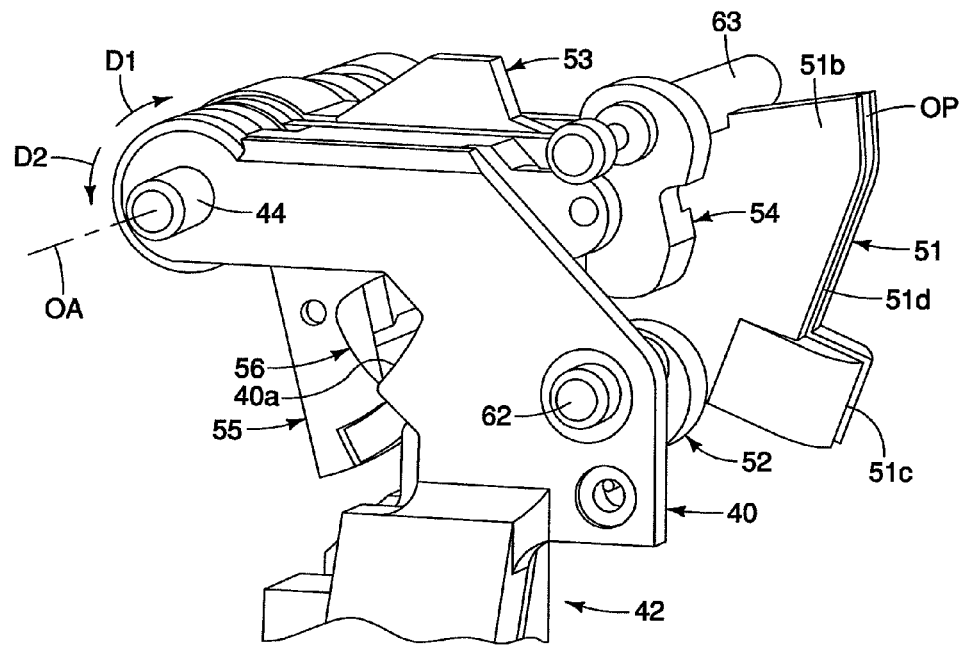
FIG. 12 is an enlarged partial perspective view of selected parts of the shift control unit with the upper ends of the control member and the second shift operating lever operatively coupled to the shift control unit.

The release pawl 56 is movably (pivotally) mounted on the second shift operating lever 42 by a pivot pin 66, which is fixed to the second shift operating lever 42 so as to attach the release pawl 56 to the second shift operating lever 42. In particular, the release pawl 56 is movable from a rest position in a direction away from the main pivot or operating axis OA of the shift unit axle 44 to a release operating position. Normally, the release pawl 56 rest on an abutment 40a of the control (wire pulling) member 40 such that when the first shift operating lever 41 is operated, the release pawl 56 does not engage the driving abutment 55a. Thus, the release pawl 56 is in its rest position only when the second shift operating lever 42 is in a non-operated position, as shown in FIGS. 12 and 13. However, when the second shift operating lever 42 is operated, the release pawl 56 moves off of the abutment 40a of the control (wire pulling) member 40 and moves towards engagement with the driving abutment 55a of the release plate 55. The release pawl 56 is urged in a counterclockwise direction (i.e., in a direction away from the operating axis OA) about the pivot pin 66 by a biasing member (not shown) in the form of a torsion spring provided with a coiled portion mounted on the pivot pin 66, a first end engaged with the release pawl 56 and a second end engaged with the second shift operating lever 42. When the second shift operating lever 42 is moved from the first (rest) position to the second (shifting) position to operate the shift control unit 38, the release plate 55 is rotated so that the release abutments 55b selectively engage the wire pulling pawl 52 and the positioning pawl 54 to release the positioning plate 53 when the release plate 55 is rotated in the first operating direction D1. Thus, the release plate 55 releases the wire takeup member 51 to rotates in the wire releasing direction D2 due to the urging force of the return spring or biasing element 58 and the cable tension in response to movement of the second shift operating lever 42.

The control (wire pulling) member 40 is pivotally mounted to the shift unit axle 44 to move along the operating plane or path Pc as mentioned above. The operating plane Pc intersects with the non-shift (brake) movement plane or path BP of the first shift operating lever 41 and is parallel with the second shift operating plane P2. The control (wire pulling) member 40 is located behind the first shift operating lever 41 and the control (wire pulling) member 40 is located in front of the second shift operating lever 42, when the first and second shift operating levers 41 and 42 are in rest positions.

Preferably, as seen in FIG. 11, the control (wire pulling) member 40 basically includes a first lever portion 71 operatively coupled to the shift control unit 38 and a second lever portion 72 spaced from the first lever portion 71. The first lever portion 71 is operatively coupled to the shift control unit 38. In particular, the first lever portion 71 of the control member 40 is pivotally connected to the shift control unit 38 about the main pivot or operating axis OA of the shift unit axle 44 to operate the shift control unit 38 when the first shift operating lever 41 is operated along the first shift operating plane or path P1. The second lever portion 72 is spaced from the first lever portion 71 and contacts the rear surface of the first shift operating lever 41. Thus, the first shift operating lever 41 is slidably engaged with the second lever portion 72 of the control member 40 such that the second lever portion 72 of the control member 40 is moved when the first shift operating lever 41 is moved along the non-shift movement path BP with sliding contact therebetween. During movement of the first shift operating lever 41 along the first shift operating plane or path P1, the control (wire pulling) member 40 is moved relative to the base member 36 to move the positioning plate 53 via the wire pulling pawl 52 to perform a wire pulling operation.

A hinge pin 73 pivotally interconnects the first and second lever portions 71 and 72 together. A biasing element 74 is mounted on the hinge pin 73 to urge the second lever portion 72 forwardly with respect to the first lever portion 71 to a rest position. This intermediate hinge between the first and second lever portions 71 and 72 allows the second lever portion 72 to pivot rearwardly with respect to the first lever portion 71 such as when the first shift operating lever 41 is operated from the rest (non-braking) position to the braking position as seen in FIGS. 5 and 6. In other words, the control member 40 includes an intermediate hinge such that the second lever portion 72 of the control member 40 is pivoted in non-operating direction when the first shift operating lever 41 is operated along the non-shift movement path BP.

The first lever portion 71 of the control member 40 has an abutment 71a (side surface) for moving the second shift operating lever 42 when the first shift operating lever 41 is operated. When the wire pulling operation is desired, the rider pushes the first shift operating lever 41 in a direction transverse to the non-shift (brake) movement plane or path BP of the first shift operating lever 41 along the first shift operating plane or path P1 from the first (rest) position to the second (shifting) position. This movement of the first shift operating lever 41 causes the control member 40 to move therewith to operate the shift control unit 38.

The second shift operating lever 42 is pivotally mounted to the shift unit axle 44 to move along the second shift operating plane or path P2. The second shift operating plane P2 intersects with the non-shift (brake) movement plane or path BP of the first shift operating lever 41. The second shift operating lever 2 and the control member 40 pivot about a coincident pivot axis of the shift unit axle 44 when performing shifting operations. The second shift operating lever 42 is located behind the first shift operating lever 41, when the first and second shift operating levers 41 and 42 are in rest positions. The second shift operating lever 42 is operatively arranged to rotate the positioning plate 53 about the main pivot or operating axis OA of the shift unit axle 44 in the second operating direction D2 via movement of the release plate 55 by the operation of the second shift operating lever 42.

In particular, as seen in FIG. 11, the second shift operating lever 42 basically includes a first lever portion 81 operatively coupled to the shift control unit 38 and a second lever portion 82 spaced from the first lever portion 81. A hinge pin 83 pivotally interconnects the first and second lever portions 81 and 82 together. A biasing element 84 is mounted on the hinge pin 83 to urge the second lever portion 82 forwardly with respect to the first lever portion 81 to a rest position. This hinge between the first and second lever portions 81 and 82 allows the second lever portion 82 to pivot rearwardly with respect to the first lever portion 81 such as when the first shift operating lever 41 is operated from the rest (non-braking) position to the braking position as seen in FIGS. 5 and 6. In other words, the second shift operating lever 42 includes a hinge such that the second lever portion 82 of the second shift operating lever 42 is pivoted in a non-operating direction when the first shift operating lever 41 is operated along the non-shift movement path BP.

The first lever portion 81 of the second shift operating lever 42 has an abutment 81*a* (flange) contacts the abutment 71*a* of the control member 40 such that the second shift operating lever 42 moves with the first shift operating lever 41 when the first shift operating lever 41 is operated. Thus, the abutments 71*a* and 81*a* are configured and arranged relative to each other such that the second shift operating lever 42 is moved by the first shift operating lever 41. The second lever portion 82 of the second shift operating lever 42 has a finger contact portion 82*a* located at the end opposite the hinge for moving the second shift operating lever 42 about the shift unit axle 44 of the shift control unit 38. When the wire releasing operation is desired, the rider pushes the finger contact portion 82*a* of the second shift operating lever 42 in a direction transverse to the non-shift (brake) movement plane or path BP of the first shift operating lever 41 along the second shift operating plane or path P2 from the first (rest) position to the second (shifting) position to operate the shift control unit 38.

Figure 16:
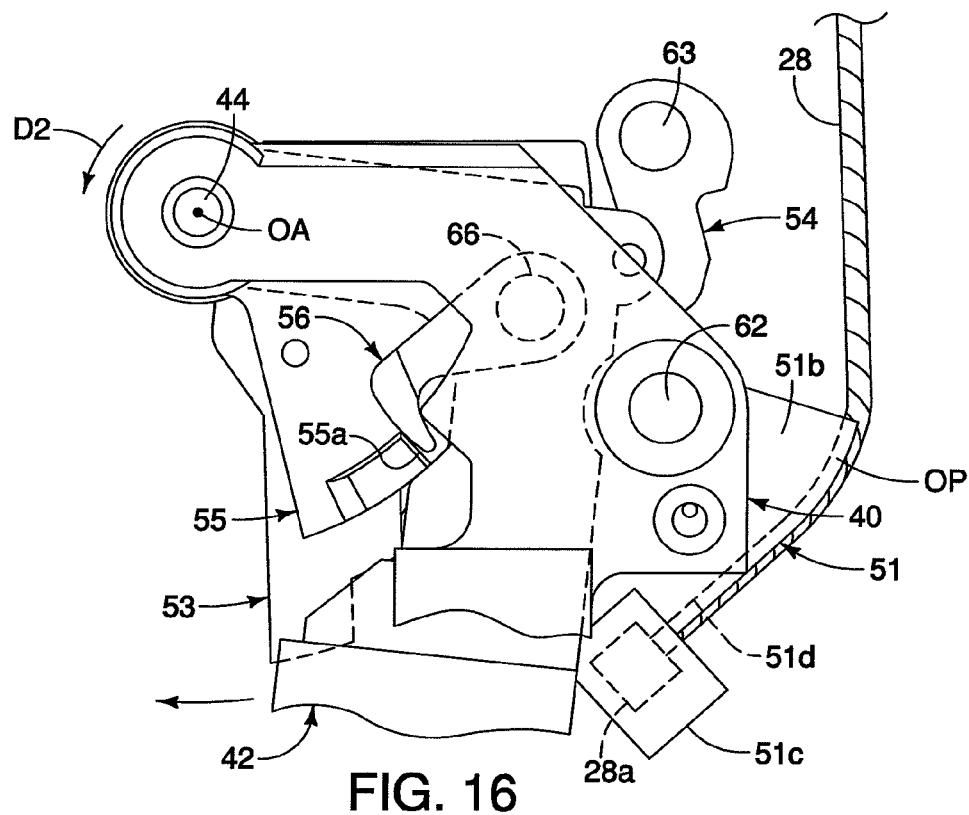
FIG. 16 is a simplified elevational view of selected parts of the shift control unit with the wire takeup member of the shift control unit being in the fully pulled position and the second shift operating lever being initially pivoted from a rest position towards the shifting position such that the release pawl engages the release plate.
Figure 20:
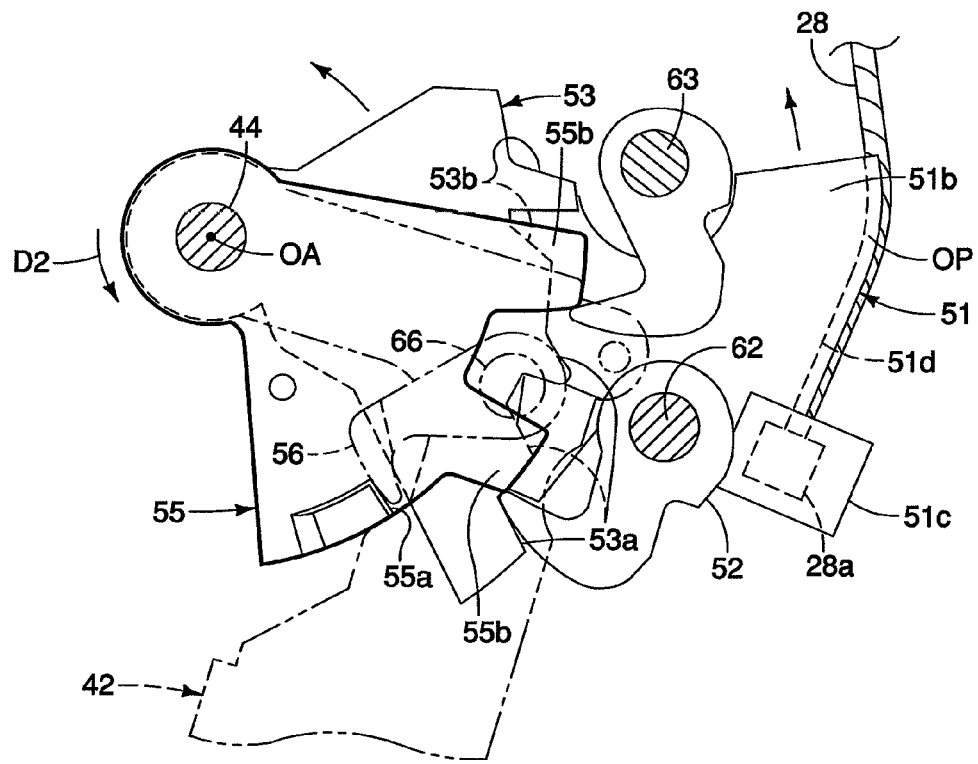
FIG. 20 is a simplified elevational view of selected parts of the shift control unit with the wire takeup member of the shift control unit moved to the fully released position, but with the second shift operating lever still in the shifting position.
Figure 21:
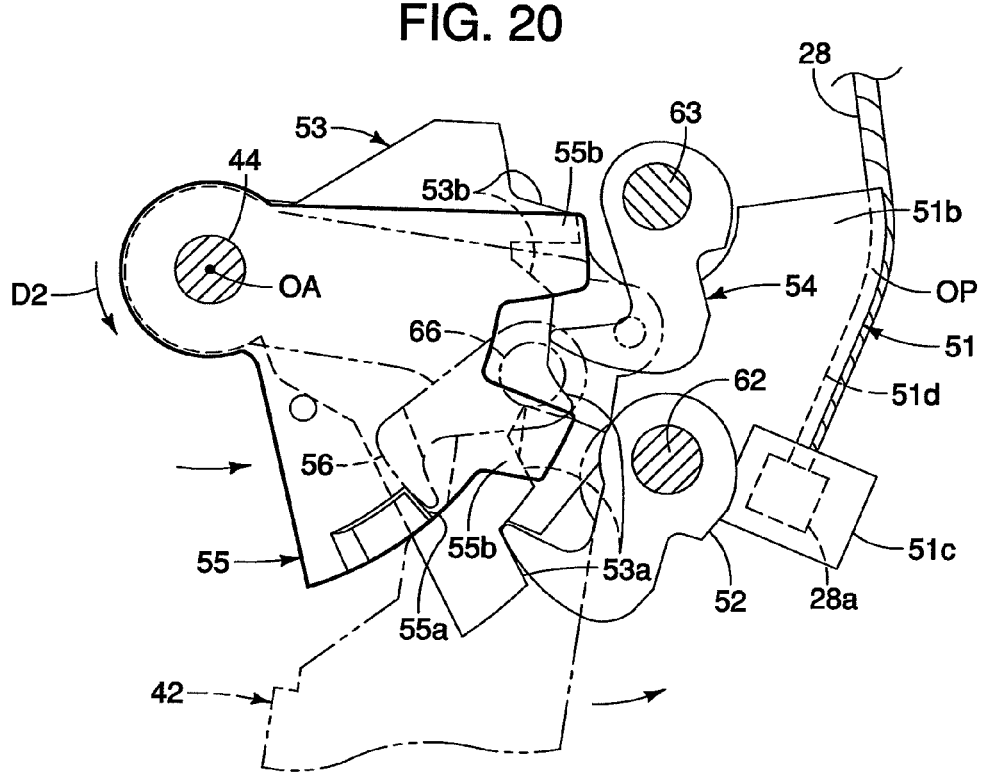
FIG. 21 is a simplified elevational view of selected parts of the shift control unit with the wire takeup member of the shift control unit in the fully released position, and the second shift operating lever and the release plate moving back to the rest positions.
Figure 22:
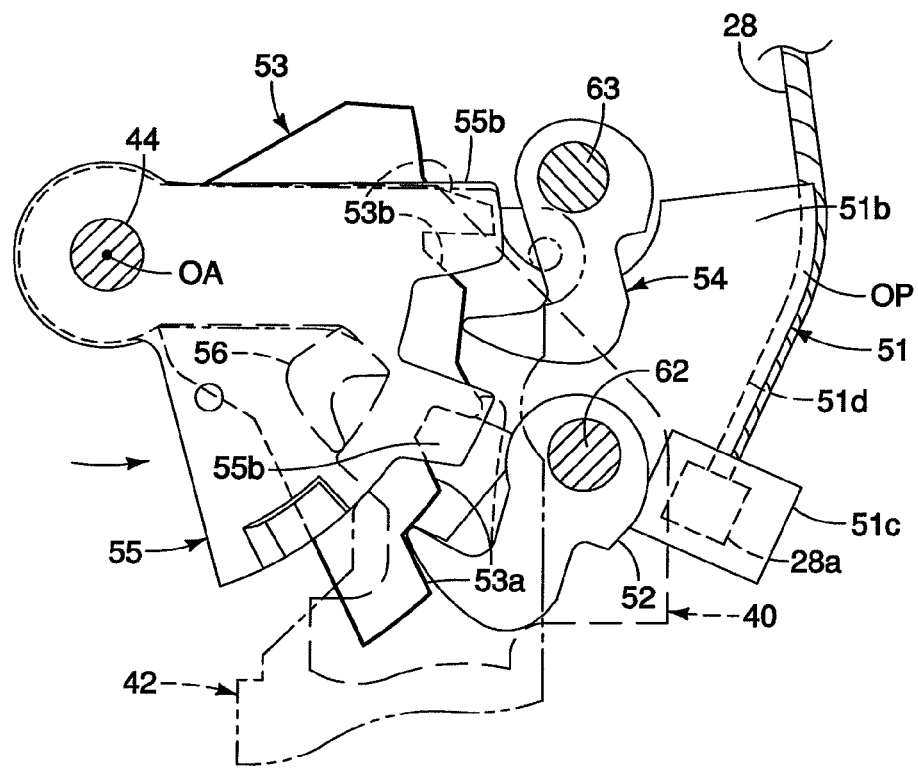
FIG. 22 is a simplified elevational view of selected parts of the shift control unit with the wire takeup member of the shift control unit in the fully released position, and the control member, the second shift operating lever and the release plate in the rest positions.
Figure 23:
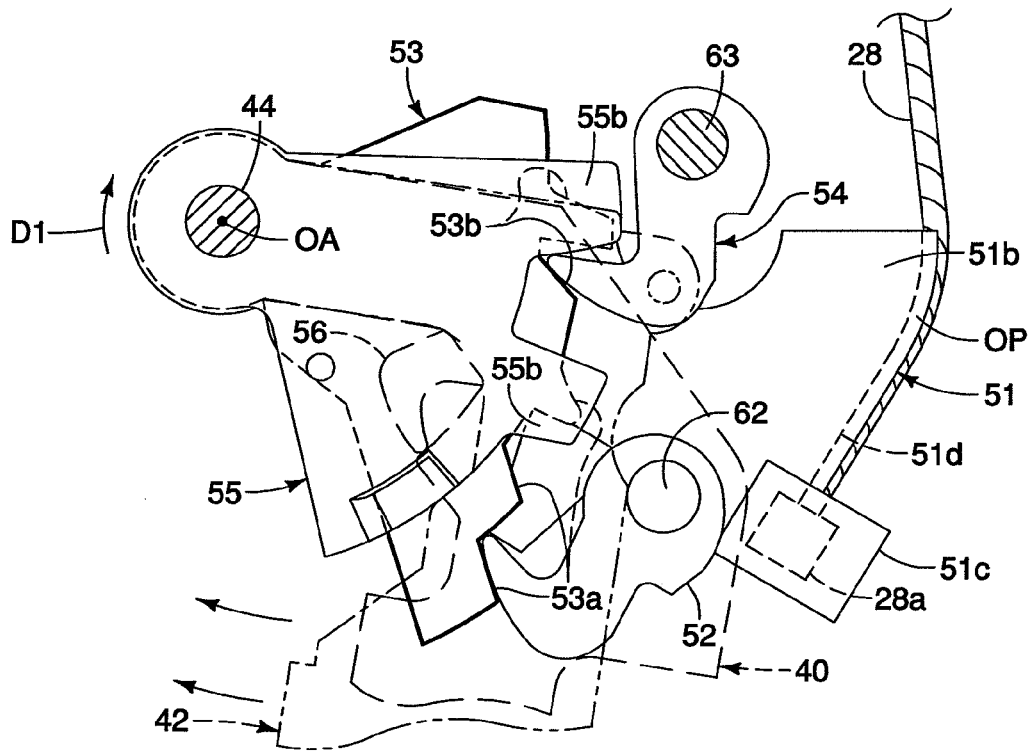
FIG. 23 is a simplified elevational view of selected parts of the shift control unit with the wire takeup member of the shift control unit in the fully released position, but with the control member being initially moved from the rest position towards the shifting position.
Figure 24:
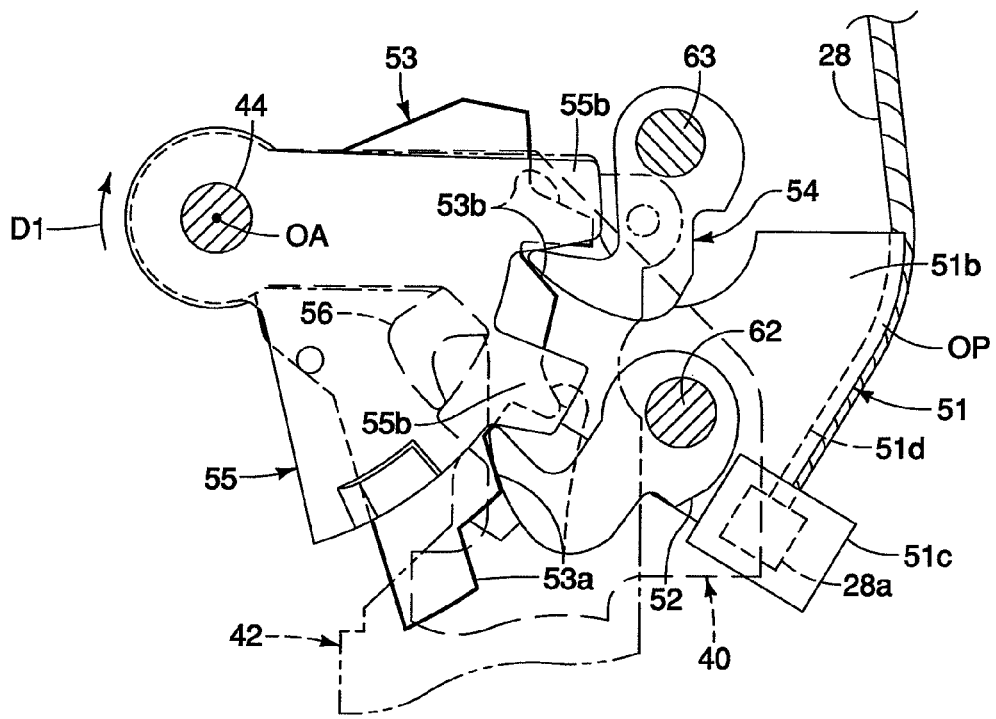
FIG. 24 is a simplified elevational view of selected parts of the shift control unit with the wire takeup member of the shift control unit in the fully released position, but with the control member being moved from the rest position to the low trim position.
Figure 25:
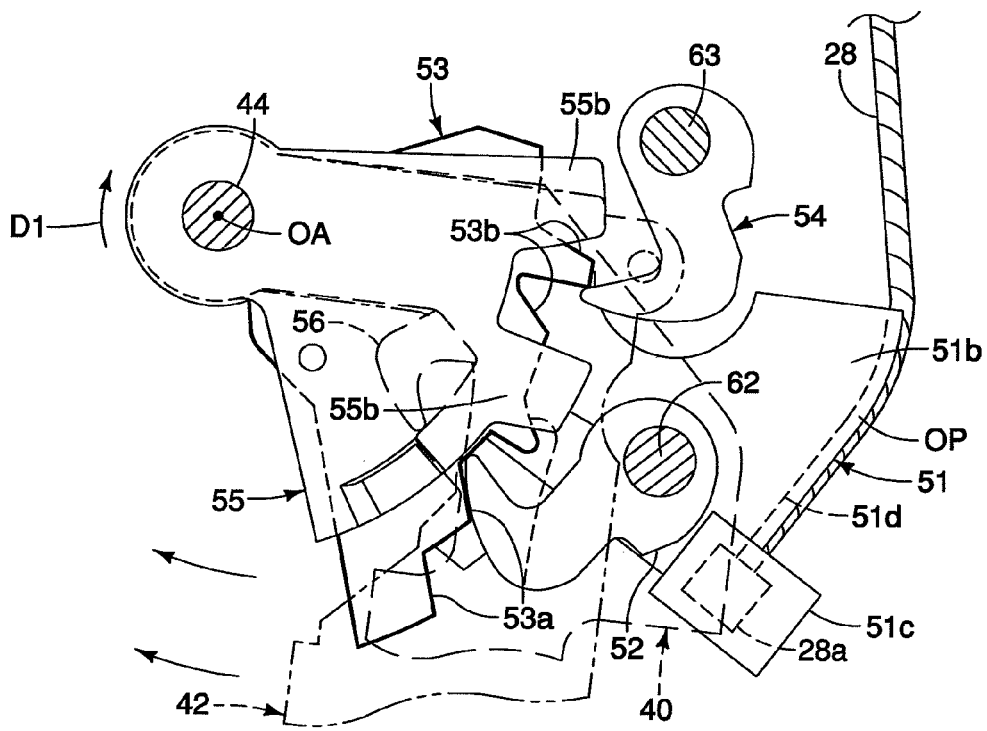
FIG. 25 is a simplified elevational view of selected parts of the shift control unit with the wire takeup member of the shift control unit in the low trim position, but with the control member being moved from the rest position towards the shifting position such that the positioning pawl and the winding pawl both move out of engagement from the positioning plate to allow the positioning plate and the wire takeup member to be rotated towards the wire pulling position.
Figure 26:
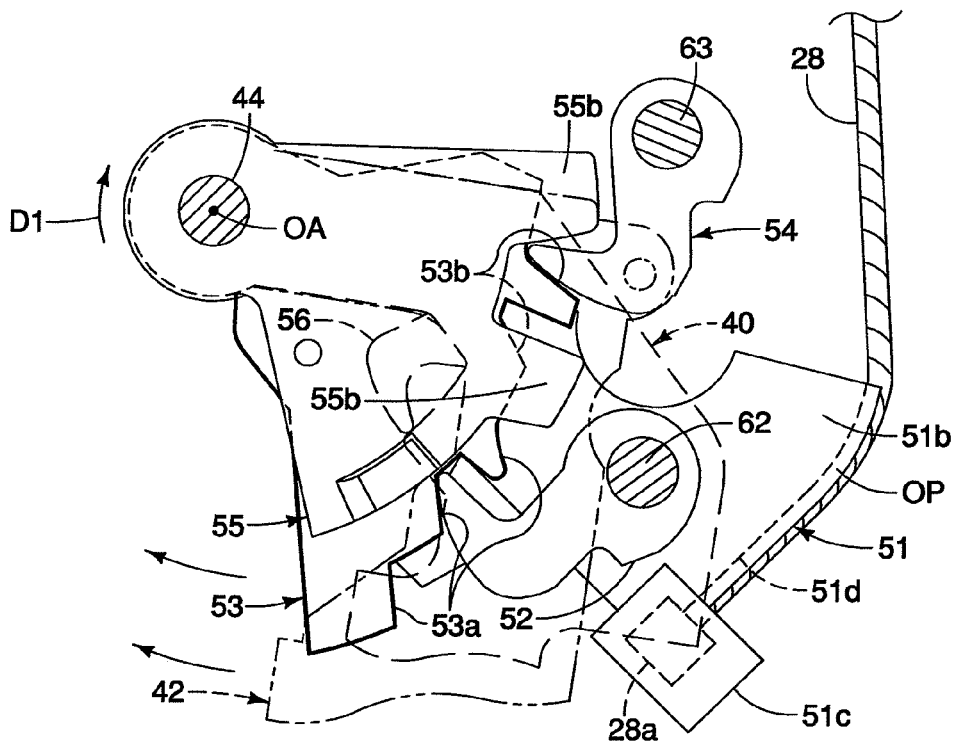
FIG. 26 is a simplified elevational view of selected parts of the shift control unit with the control member being moved further from the position of FIG. 25 towards the shifting position such that the positioning pawl and the winding pawl both move back into engagement with the positioning plate to maintain the positioning plate and the wire takeup member in the fully pulled position.

FIGS. 16 to 21 illustrate an inner wire releasing operation, while FIGS. 22 to 27 illustrate an inner wire pulling operation. In the illustrated embodiment, the fully wire pulled position of FIG. 16 is a low gear position of the shift control unit 38 for holding the front derailleur 26 in a low gear position, while the fully wire released position of FIG. 22 is a top gear position of the shift control unit 38 for holding the front derailleur 26 in a top gear position. FIG. 24 illustrates a low gear trim position of the shift control unit 38 for holding the front derailleur 26 in a low gear trim position.

Figure 17:
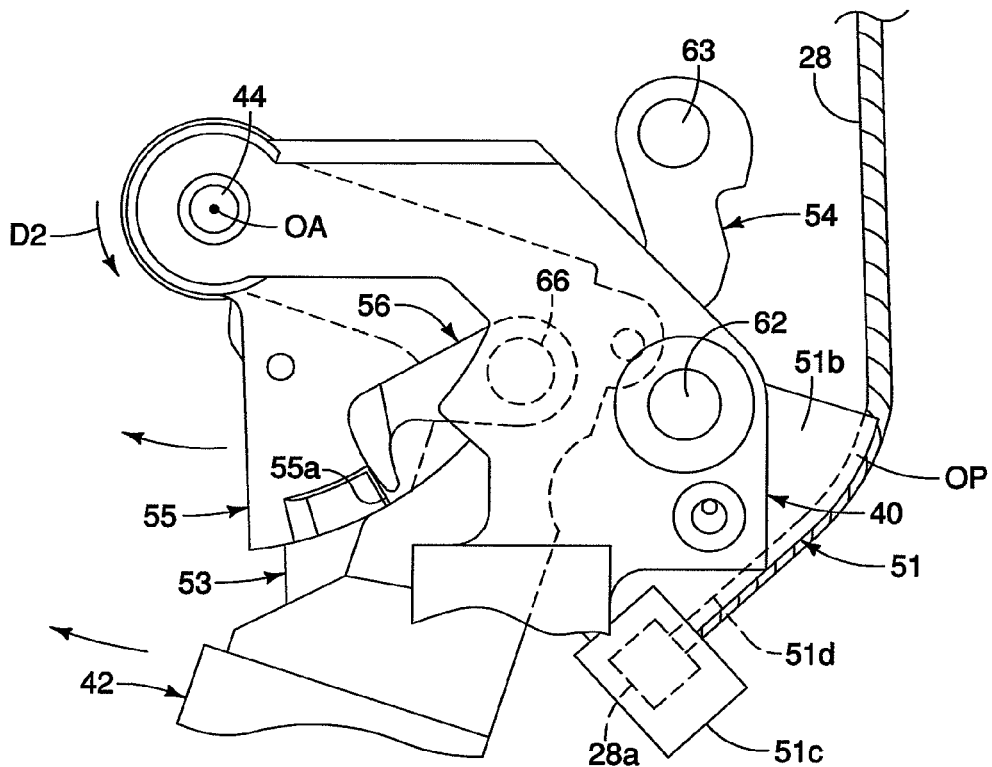
FIG. 17 is a simplified elevational view of selected parts of the shift control unit with the wire takeup member of the shift control unit being in the fully pulled position and the second shift operating lever being pivoted further from the position of FIG. 16 towards the shifting position such that the release plate moves with the second shift operating lever.
Figure 18:
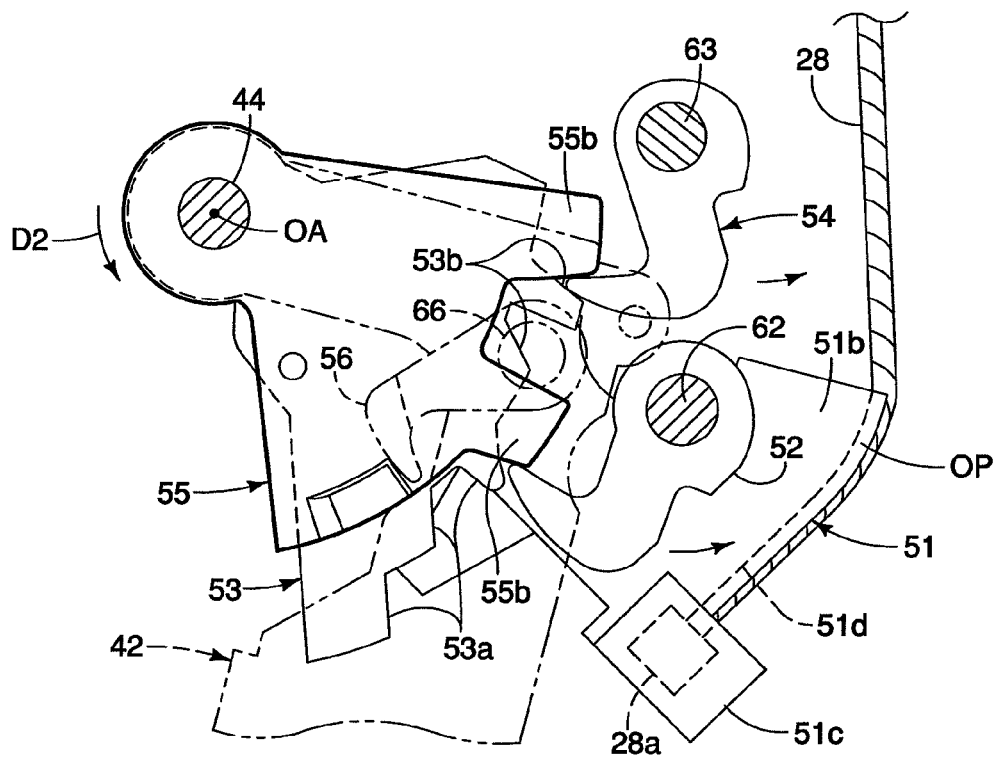
FIG. 18 is a simplified elevational view of selected parts of the shift control unit with the wire takeup member of the shift control unit being in the fully pulled position and the second shift operating lever being pivoted further from the position of FIG. 17 towards the shifting position such that the positioning pawl and the winding pawl both move out of engagement from the positioning plate to allow the positioning plate and the wire takeup member rotate towards the wire released position.
Figure 19:
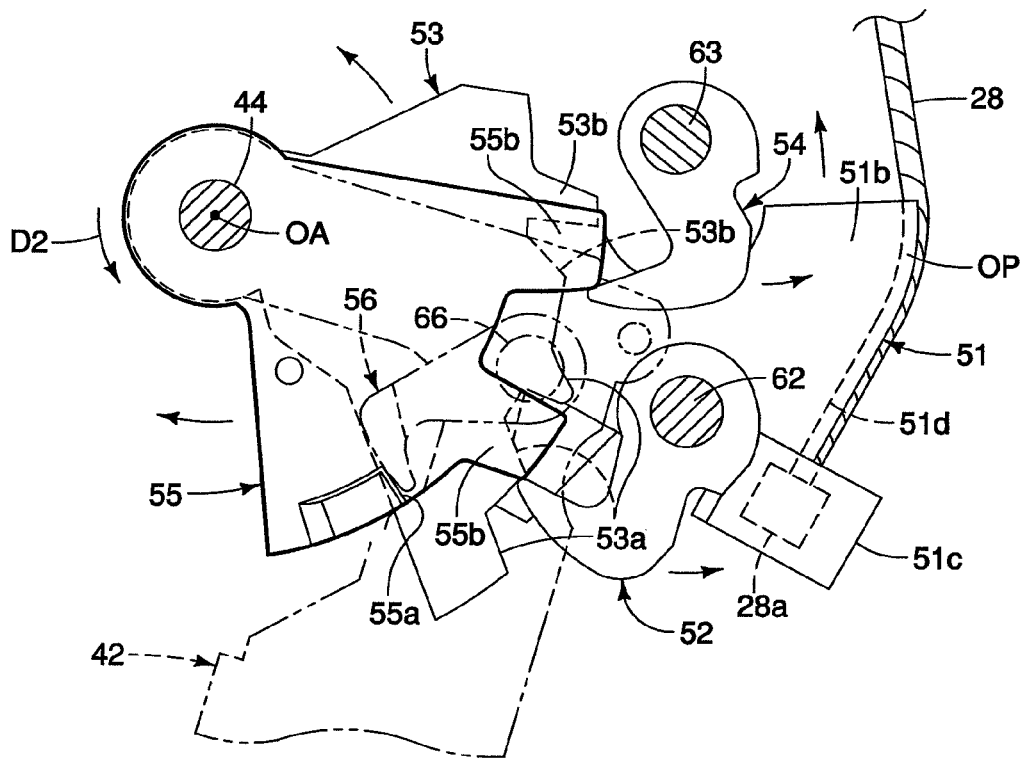
FIG. 19 is a simplified elevational view of selected parts of the shift control unit with the wire takeup member of the shift control unit being released to move to the fully released position.

As seen in FIG. 16, the wire takeup member 51 of the shift control unit 38 is in the fully pulled position and the second shift operating lever 42 is being initially pivoted from the rest position towards the shifting position such that the release pawl 56 engages the driving abutment 55*a* of the release plate 55. As seen in FIG. 17, by pivoting the second shift operating lever 42 further from the position of FIG. 16 towards the shifting position, once the release pawl 56 engages the driving abutment 55*a* of the release plate 55, the release plate 55 now moves with the second shift operating lever 42. As seen in FIGS. 18 and 19, by pivoting the second shift operating lever 42 further from the position of FIG. 17 towards the shifting position, the winding pawl 52 and the positioning pawl 54 are both moved (pivoted) out of engagement from the positioning plate 53 to allow the positioning plate 53 and the wire takeup member 51 rotate towards the wire released position. As seen in FIG. 20, with the winding pawl 52 and the positioning pawl 54 both disengaged from the positioning plate 53 by the release abutments 55*b*, the wire takeup member 51 and the positioning plate 53 both move to the fully released position, with the second shift operating lever 42 still in the shifting position. As seen in FIGS. 21 and 22, when the second shift operating lever 42 is released, the second shift operating lever 42 and the release plate 55 moving back to their rest positions.

Figure 27:
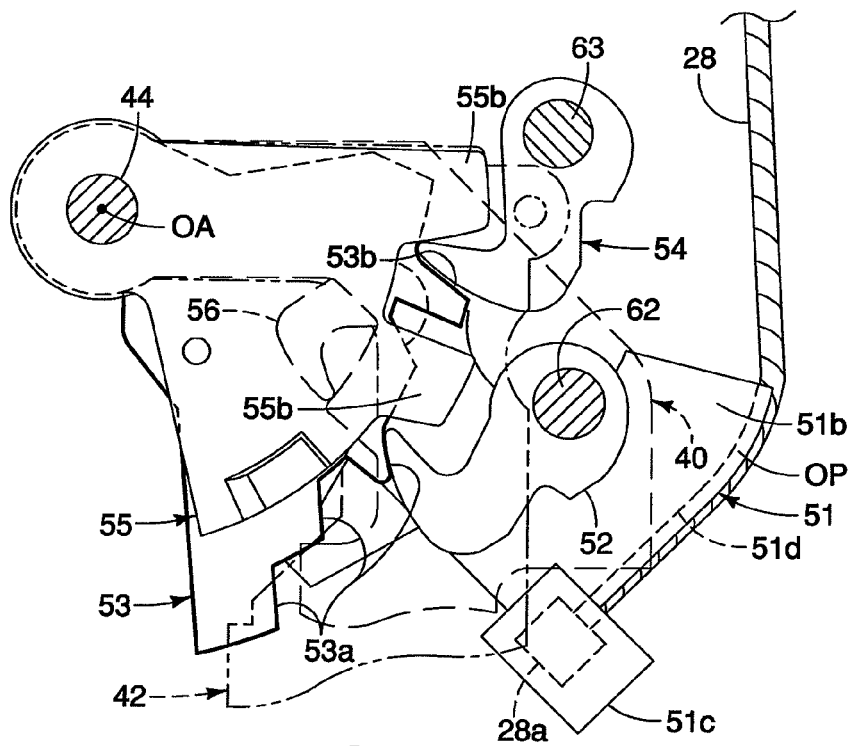
FIG. 27 is a simplified elevational view of selected parts of the shift control unit with the wire takeup member of the shift control unit in the fully pulled position, and the control member and the second shift operating lever moved back to the rest position.

In the case of a wire pulling operation, the first shift operating lever 41 is moved from the rest position to the shifting position which in turn moves the control (wire pulling) member 40, which is pivotally mounted to the shift unit axle 44. This pivotally movement of the control (wire pulling) member 40 to the shifting position causes the second shift operating lever 42 to pivot with the first shift operating lever 41 as shown in FIG. 7. For the purpose of clarity, the first shift operating lever 41 will not be shown in FIGS. 22 to 27. Rather, only the movement of the control (wire pulling) member 40 and the second shift operating lever 42 will be illustrated in phantom lines in FIGS. 22 to 27. From the fully released position of FIG. 22, during an inner wire pulling operation, the control (wire pulling) member 40 is moved by the first shift operating lever 41 such that either a low gear trim position is attained by partial movement of the first shift operating lever 41 as seen in FIG. 23 or a top gear position is attained by complete or subsequent movement of the first shift operating lever 41 past the low gear trim position to the top gear position as seen in FIG. 27. As seen in FIG. 23, when the control member 40 is initially moved from the rest position towards the shifting position, the winding pawl 52 engages one of the winding abutments 53*a* of the positioning plate 53 to rotate the positioning plate 53 and the wire takeup member 51 in the wire pulling direction. Also during this movement of the positioning plate 53, the positioning pawl 54 is pivoted to engage the low gear trim abutment of the positioning abutments 53*b*. The first shift operating lever 41 can now be release to attain the position in FIG. 24, if a low gear trim position is desired or moved further to attain the position in FIG. 27, if a top gear position is desired. Of course, the top gear position can also be attained from the low gear trim position as seen in FIGS. 24 to 27.

In the above discussed embodiment, the shift control unit 38 is illustrated as a cable operating shift control unit, which is merely one example of a shift control unit that can be used with the bicycle control device 14. In other words, the shift control unit for the bicycle control device 14 is not limited to a cable operating system, but rather other types of shift control units can be used with the bicycle control device 14 described and illustrated herein. For example, the shift control unit 38 can be replaced an electrical shift control unit, or a pneumatic shift control unit, or hydraulic shift control unit. In the case of an electrical shift control unit, at least a pair of electrical switches would be provided for performing upshift and downshift operations in response to selective movements of the first and second shift operating levers 41 and 42. In the case of a pneumatic shift control unit or hydraulic shift control unit, a valve system would be provided for performing upshift and downshift operations in response to selective movements of the first and second shift operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
    a base member;
    a wire takeup member movably mounted relative to the base member about a pivot axis;
    a winding lever pivotally mounted relative to the base member to operate the wire takeup member in a first direction about the pivot axis to perform a wire pulling operation;
    a release lever pivotally mounted relative to the base member to operate the wire takeup member in a second direction about the pivot axis to perform a wire releasing operation, the second direction being opposite the first direction, and the winding lever remaining stationary as the release lever operates the wire takeup member in the second direction such that there is relative movement between the winding lever and the release lever during the wire releasing operation;
    a release member pivotally mounted relative to the base member about the pivot axis; and
    a release pawl movably mounted on the release lever such that the release pawl is movable from a rest position in a direction away from the pivot axis to a release operating position in response to movement of the release lever, the release pawl being disengaged from the release member in the rest position and being engaged with the release member in the release operating position.

2. The bicycle control device according to claim 1, wherein the release pawl is pivotally mounted on the release lever.

3. The bicycle control device according to claim 1, wherein the wire takeup member is moved in the second direction in response to movement of the release lever from a first position to a second position, and the wire takeup member is at rest when the release lever is in the first position.

* * * * *